United States Patent
McQueen

(10) Patent No.: US 12,526,298 B2
(45) Date of Patent: Jan. 13, 2026

(54) SYSTEM AND METHOD FOR FRAUD IDENTIFICATION

(71) Applicant: Yahoo Assets LLC, New York, NY (US)

(72) Inventor: Donald J McQueen, Leesburg, VA (US)

(73) Assignee: Yahoo Assets LLC, New York, NY (US)

(*) Notice: Subject to any disclaimer, the term of this patent is extended or adjusted under 35 U.S.C. 154(b) by 261 days.

(21) Appl. No.: 18/133,594

(22) Filed: Apr. 12, 2023

(65) Prior Publication Data

US 2024/0348630 A1 Oct. 17, 2024

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ............ H04L 63/1425; H04L 63/1416; H04L 2101/668; H04L 63/0236; H04L 63/1441; H04L 63/1433; H04L 61/5007; H04L 63/126; H04L 63/1483; H04L 63/10; H04L 67/02; H04L 63/0227; H04L 63/101; H04L 51/212; H04L 67/306; H04L 63/02; H04L 63/0272; H04L 69/16; H04L 43/028
See application file for complete search history.

(56) References Cited

U.S. PATENT DOCUMENTS

| | | |
|---|---|---|
| 2020/0153854 A1 | 5/2020 | McQueen et al. |
| 2022/0191173 A1* | 6/2022 | Karpovsky ......... H04L 63/1433 |
| 2023/0199002 A1* | 6/2023 | Kaidi .................. H04L 63/1425 726/22 |

OTHER PUBLICATIONS

Federal Communication Commission: Internet Protocol Version 6 (IPv6), https://www.fcc.gov/consumers/guides/internet-protocol-version-6-ipv6-consumers, Oct. 31, 2016, retrieved on Apr. 11, 2023, 3 pages.
Wikipedia: "Classless Inter-Domain Routing", https://en.wikipedia.org/wiki/Classless_Inter-Domain_Routing, retrieved on Apr. 11, 2023, 7 pages.

(Continued)

*Primary Examiner* — Ryan J Jakovac
(74) *Attorney, Agent, or Firm* — Cooper Legal Group LLC

(57) ABSTRACT

In an example, first-tier Internet Protocol (IP) address reputation scores, including a first first-tier IP address reputation score associated with a first first-tier IP address group and a second first-tier IP address reputation score associated with a second first-tier IP address group, may be determined based upon a plurality of events. A second-tier IP address reputation score associated with a second-tier IP address group may be determined based upon the plurality of first-tier IP address reputation scores. The second-tier IP address group may include the first first-tier IP address group and the second first-tier IP address group. An IP address reputation profile may be generated based upon the first-tier IP address reputation scores and the second-tier IP address reputation score. Whether or not a request for content associated with a first IP address is fraudulent may be determined based upon the IP address reputation profile and the first IP address.

20 Claims, 9 Drawing Sheets

(56) References Cited

OTHER PUBLICATIONS

"XGBoost Documentation", https://xgboost.readthedocs.io/en/stable, retrieved on Apr. 11, 2023, 3 pages.
T. Narten, G. Huston, L. Roberts: "IPV6 Address Assignment to End Sites", Internet Engineering Task Force (IETF), ISSN: 2070-1721, Mar. 2011, https://www.rfc-editor.org/rfc/rfc6177.html, retrieved on Apr. 11, 2023, 9 pages.
Wikipedia: "Autonomous System (Internet)", https://en.wikipedia.org/wiki/Autonomous_system_(Internet), retrieved on Apr. 11, 2023, 5 pages.
Penny Hoelscher: "Spam vs. Phishing: Definitions, Overview and Examples", Infosec, Jul. 9, 2018, https://resources.infosecinstitute.com/spam-vs-phishing-definitions-overview-examples, retrieved on Apr. 11, 2023, 9 pages.
"8 IP Reputation Checkers that Work [2023]", https://www.sendx.io/resources/ip-reputation-checker, retrieved on Jul. 12, 2023, 10 pages.

* cited by examiner

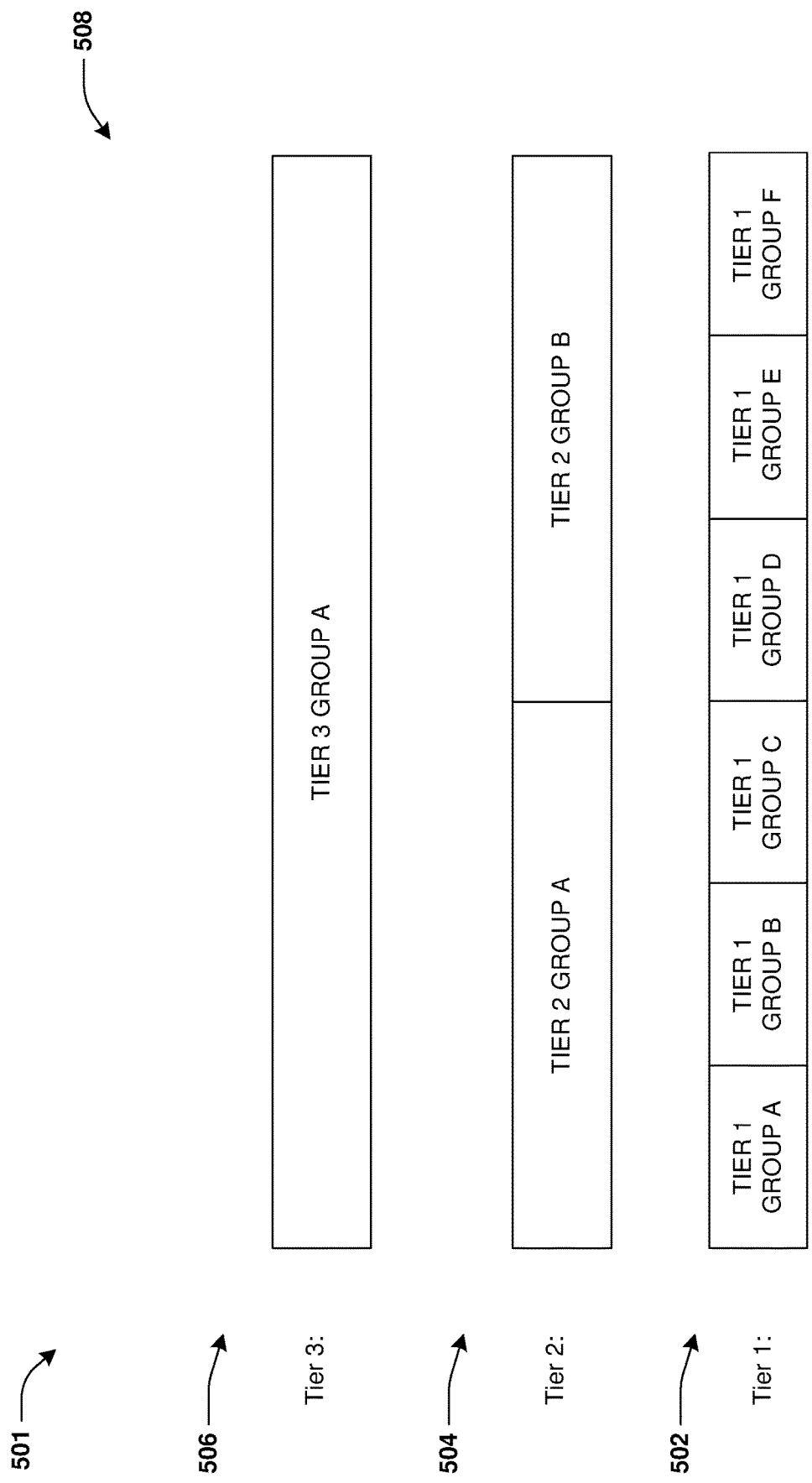

SYSTEM AND METHOD FOR FRAUD IDENTIFICATION

BACKGROUND

Many applications, such as websites, applications, etc. may provide platforms for viewing media. For example, a request for media may be received from a device associated with a user. Responsive to receiving the request for media, media may be transmitted to the device. However, the request for media may be fraudulent.

SUMMARY

In accordance with the present disclosure, one or more computing devices and/or methods are provided. In an example, network activity may be analyzed to identify a plurality of events. A plurality of first-tier Internet Protocol (IP) address reputation scores may be determined based upon the plurality of events. Determining the plurality of first-tier IP address reputation scores comprises (i) determining a first first-tier IP address reputation score based upon one or more first events, of the plurality of events, associated with a first first-tier IP address group, and (ii) determining a second first-tier IP address reputation score based upon one or more second events, of the plurality of events, associated with a second first-tier IP address group. A second-tier IP address reputation score associated with a second-tier IP address group may be determined based upon the plurality of first-tier IP address reputation scores. The second-tier IP address group may comprise the first first-tier IP address group and the second first-tier IP address group. An IP address reputation profile may be generated based upon the plurality of first-tier IP address reputation scores and the second-tier IP address reputation score. A request for content associated with a first IP address may be received. Whether or not the request for content is fraudulent may be determined based upon the IP address reputation profile and the first IP address.

In an example, network activity may be analyzed to identify a plurality of events. A plurality of first-tier IP address reputation scores may be determined based upon the plurality of events. Determining the plurality of first-tier IP address reputation scores comprises (i) determining a first first-tier IP address reputation score based upon one or more first events, of the plurality of events, associated with a first first-tier IP address group, and (ii) determining a second first-tier IP address reputation score based upon one or more second events, of the plurality of events, associated with a second first-tier IP address group. A second-tier IP address reputation score associated with a second-tier IP address group may be determined based upon the plurality of first-tier IP address reputation scores. The second-tier IP address group may comprise the first first-tier IP address group and the second first-tier IP address group. An IP address reputation profile may be generated based upon the plurality of first-tier IP address reputation scores and the second-tier IP address reputation score. A request for content associated with a first IP address may be received. A fraud risk score associated with the request for content may be determined based upon the IP address reputation profile and the first IP address.

In an example, network activity may be analyzed to identify a plurality of events. A plurality of first-tier client identifier reputation scores may be determined based upon the plurality of events. Determining the plurality of first-tier client identifier reputation scores comprises (i) determining a first first-tier client identifier reputation score based upon one or more first events, of the plurality of events, associated with a first first-tier client identifier group, and (ii) determining a second first-tier client identifier reputation score based upon one or more second events, of the plurality of events, associated with a second first-tier client identifier group. A second-tier client identifier reputation score associated with a second-tier client identifier group may be determined based upon the plurality of first-tier client identifier reputation scores. The second-tier client identifier group may comprise the first first-tier client identifier group and the second first-tier client identifier group. A client identifier reputation profile may be generated based upon the plurality of first-tier client identifier reputation scores and the second-tier client identifier reputation score. A request for content associated with a first client identifier may be received. A fraud risk score associated with the request for content may be determined based upon the client identifier reputation profile and the first client identifier.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5A is a component block diagram illustrating an example representation of a multi-tier hierarchy of IP address groups.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
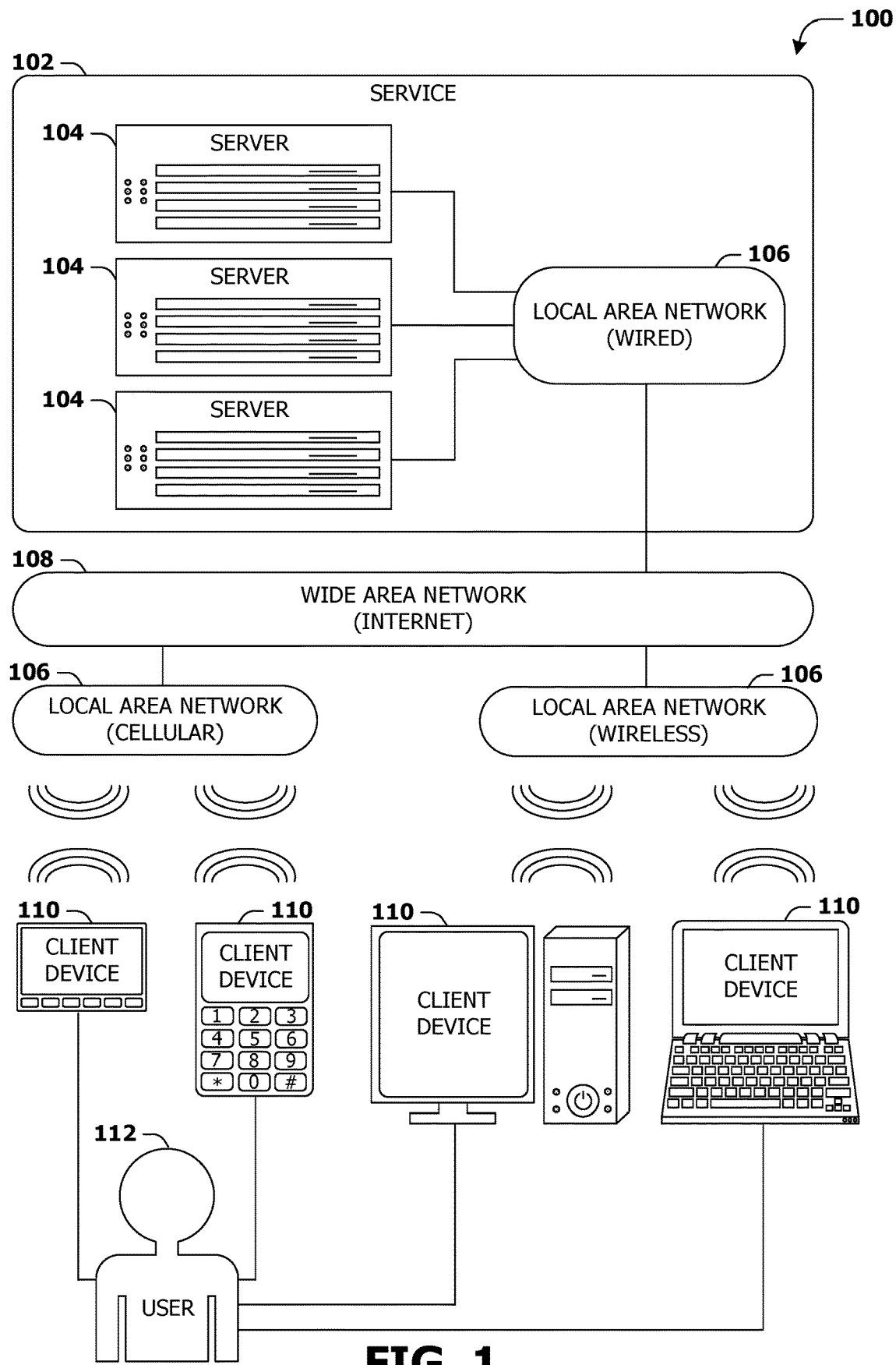
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
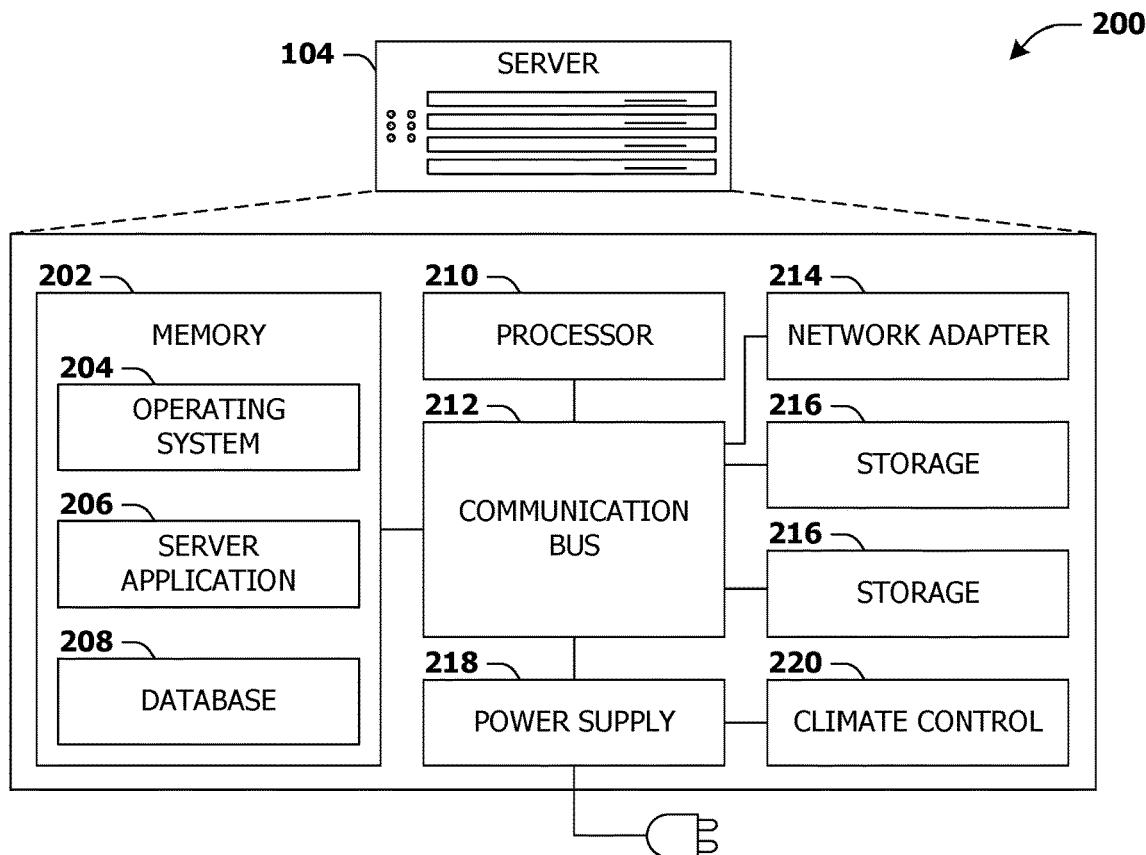
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
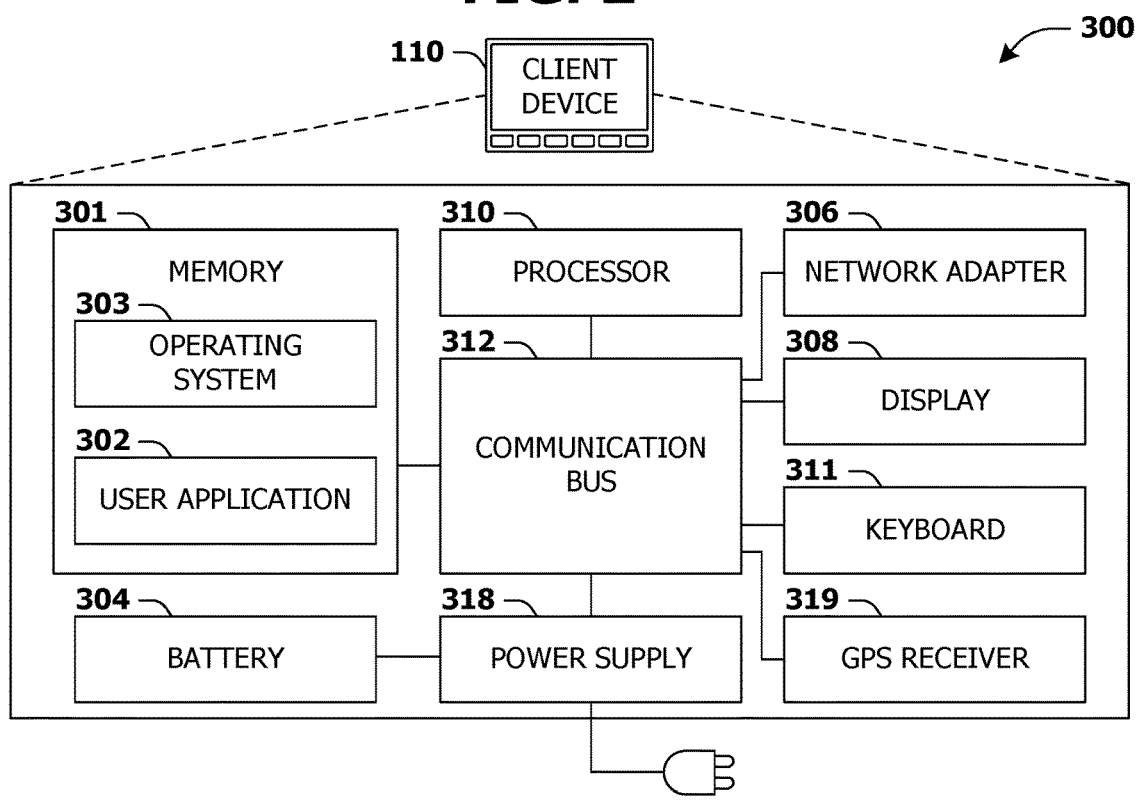
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining tier-based IP address reputation scores and/or identifying fraudulent requests and/or entities based upon the tier-based IP address reputation scores are provided. In advertising fraud, advertisement signals associated with internet resources and/or client devices may be received by an advertisement system. The advertisement signals may indicate advertisement impressions, clicks, conversions, etc. performed by a client device. However, the purported advertisement impressions, clicks, conversions, etc. may not be performed by legitimate users having an interest in relevant advertisements. Rather, the advertisement signals may be transmitted to the advertisement system by one or more malicious actors, such as one or more bots (of a botnet, for example), hacked client devices (e.g., zombie computers), click farms, fake websites, data centers, etc. The malicious actors may request compensation for the purported advertisement impressions, clicks, conversions, etc., and, unless the malicious actors and/or fraudulent requests (e.g., fraudulent ad requests) from the malicious actors are identified, the malicious actors may continue being compensated. Advertising fraud is estimated to cost the advertising industry billions of dollars per year and automated and/or real-time solutions to advertising fraud are needed.

Some systems attempt to identify fraud by looking at behaviors of individual IP addresses, and determining an abuse-rating for each IP address. However, malicious actors have circumvented such systems by frequently changing IP addresses before activity on an IP address would be flagged as an anomaly. Further, with the increasing use of Internet Protocol version 6 (IPv6), which provides for large numbers of IP addresses being allotted to subscribers' modems (e.g., billions of IP addresses may be allotted to a single subscriber modem of a household), IP addresses are changed more frequently, which may make it even more difficult to determine per-IP address abuse ratings and/or use the per-IP address abuse ratings to prevent fraud. For example, IPv6 may provide for random assignment of IP addresses within a home network from a vast pool (e.g., billions) of IP addresses, which may result in the same IP address being used by a client device merely once (e.g., a client device may be assigned a new IP address each session).

Thus, in accordance with one or more of the techniques presented herein, a multi-tier hierarchy of IP address groups may be defined, and IP address reputation scores may be determined for IP address groups of the multi-tier hierarchy of IP address groups. Different tiers of the multi-tier hierarchy may be associated with different sized groups. For example, an IP address group of a first tier may have a first size, an IP address group of a second tier may have a second size larger than the first size, and an IP address group of a third tier may have a third size larger than the second size. In some examples, network activity may be analyzed to identify a plurality of events. Features (e.g., behavioral features) associated with IP address groups of the first tier may be determined based upon the plurality of events, and may be used to determine IP address reputation scores for the IP address groups of the first tier. The IP address reputation scores associated with the first tier may be used (e.g., combined) to determine IP address reputation scores of higher-tier groups of the second tier and/or the third tier.

In some examples, sizes of the IP address groups of the multi-tier hierarchy may be defined such that the IP address groups correspond to real life entities where a real person might be expected to live and/or travel. A first IP address group of the first tier may represent a household, an office, etc. and/or a modem (e.g., a cable modem) associated with the household, the office, etc. A second IP address group of the second tier may comprise the first IP address group (and/or other IP address groups of the first tier), and may represent a neighborhood, a town, etc. comprising the household, the office, etc. associated with the first IP address group and/or one or more other households, offices, etc. A third IP address group of the third tier may comprise the second IP address group (and/or other IP address groups of the second tier), and may represent a provider network encompassing the neighborhood, the town, etc. associated with the second IP address group and/or one or more other neighborhoods, towns, etc.

A request for content (e.g., an ad request) may be received from a first IP address of the first IP address group. For example, the request for content may be received from a client device that is connected to the modem associated with the first IP address group (e.g., a user of the client device may be part of the household, the office, etc. associated with the first IP address group). In response to the request for content, an IP address reputation profile comprising IP address reputation scores (e.g., updated IP address reputation scores) associated with IP address groups of the multi-tier hierarchy may be analyzed to identify one or more IP address reputation scores associated with the first IP address. For example, the one or more IP address reputation scores may comprise a first IP address reputation score associated with the first IP address group (which comprises the first IP address), a second IP address reputation score associated with the second IP address group (which comprises the first IP address group), and/or a third IP address reputation score associated with the third IP address group (which comprises the second IP address group). The one or more IP address reputation scores may be used to (i) determine a fraud risk score associated with the request for content and/or (ii) determine whether or not the request for content is fraudulent. The one or more IP address reputation scores associated with one or more IP address groups (e.g., the first IP address group, the second IP address group, and/or the third IP address group) may capture a more complete and/or accurate scope of behavior over time (compared with techniques that only look at a single IP address, for example), and may mitigate (e.g., eliminate) the effects of abusers changing their IP addresses to other IP addresses of a group in an attempt to obfuscate their malicious activity.

There may be situations in which the first IP address reputation score associated with the first IP address group is not available (such as due, at least in part, to insufficient event data being available for determining the first IP address reputation score associated with the first IP address group). In such situations, there may still be one or more parent scores (e.g., the second IP address reputation score and/or the third IP address reputation score) associated with one or more parent groups (e.g., the second IP address group of the second tier and/or the third IP address group of the third tier) that are available and applicable to the first IP address. Thus, in accordance with one or more of the techniques provided herein, the one or more parent scores be used to determine the fraud risk score and/or determine whether or not the request for content is fraudulent.

Figure 4:
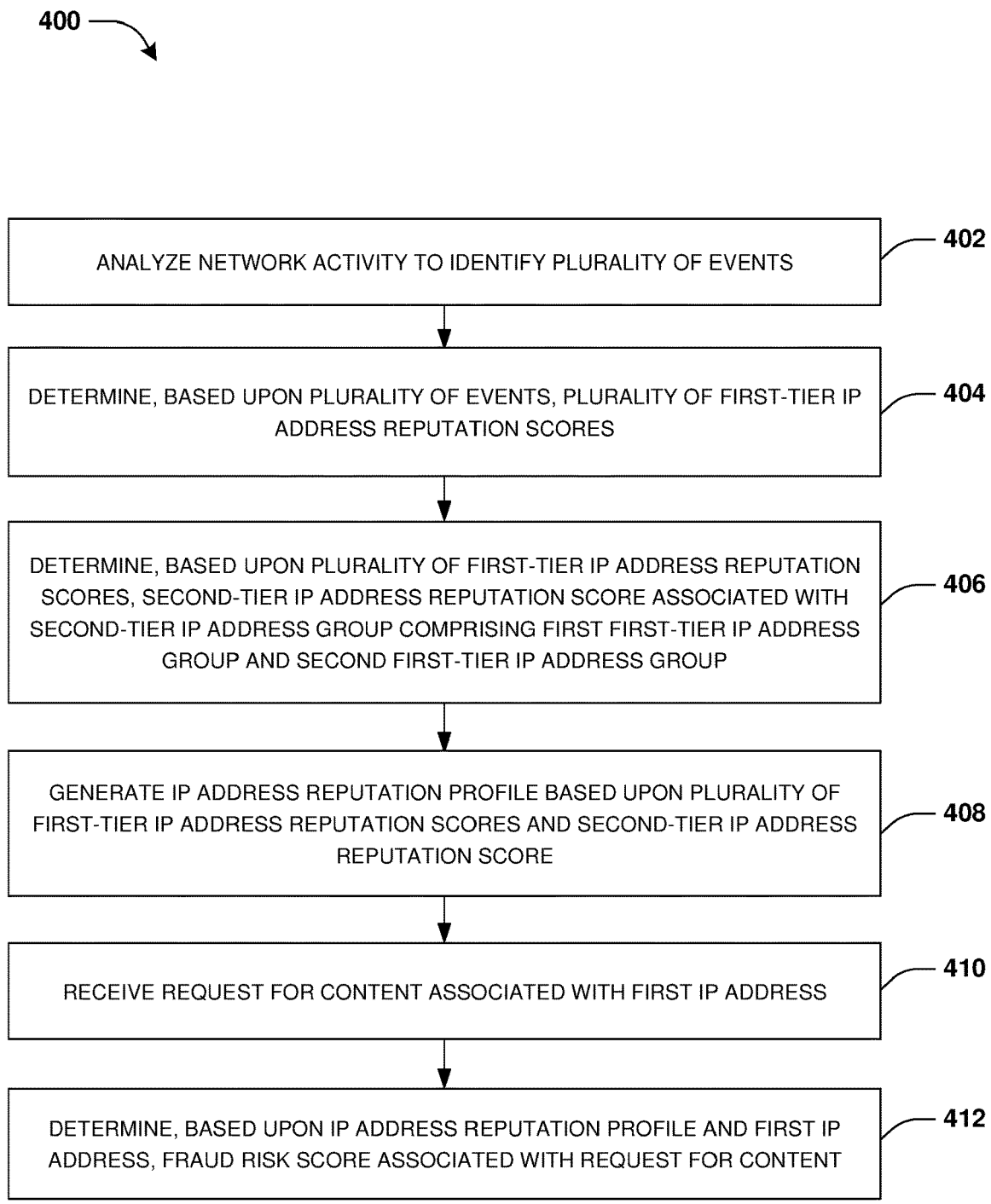
FIG. 4 is a flow chart illustrating an example method for determining tier-based Internet Protocol (IP) address reputation scores and/or identifying fraudulent requests based upon the tier-based IP address reputation scores.

An embodiment of determining tier-based IP address reputation scores and/or identifying fraudulent requests based upon the tier-based IP address reputation scores is illustrated by an example method 400 of FIG. 4, and is further described in conjunction with system 501 of FIGS. 5A-5D. A content system for presenting content via devices may be provided. In some examples, the content system may be an advertisement system (e.g., an online advertising system). Alternatively and/or additionally, the content system may not be an advertisement system. In some examples, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with a content item before the user can access content of a web page and/or video stream application, utilize resources of an application and/or play a game.

At 402 of FIG. 4, the content system may analyze network activity to identify a plurality of events. The plurality of events may be associated with a plurality of IP addresses and/or the network activity may comprise activity (e.g., Internet activity) performed in association with the plurality of IP addresses. In an example, an IP address of the plurality of IP addresses may be associated with a client device. The plurality of events may comprise an event associated with the IP address. The event may correspond to an event in which the client device sends or receives data to or from a server.

In some examples, the plurality of events may comprise one or more resource access events in which one or more internet resources (e.g., at least one of content, data, one or more web pages, one or more applications, etc.) are accessed by a device associated with an IP address of the plurality of IP addresses.

In some examples, the plurality of events may comprise one or more content events in which one or more content items (e.g., advertisements, videos, images, etc.) are transmitted to (and/or presented on) a device associated with an IP address of the plurality of IP addresses.

In some examples, the plurality of events may comprise one or more authentication events in which an authentication process is performed in association with a device associated with an IP address of the plurality of IP addresses. For example, the authentication process may be performed to authenticate a user of the device. The authentication process may be performed to determine whether or not the user is authorized to access one or more resources, and/or whether or not the user is authorized to log into a user account. The authentication process may be performed based upon one or more authentication credentials (e.g., a username, a password, an answer to a security question, etc.) received from the device.

In some examples, the plurality of events may comprise one or more user validation events in which a user validation process is performed in association with a device associated with an IP address of the plurality of IP addresses. For example, the user validation process may be performed to determine whether or not a user of the device is human (instead of a bot, for example). The user validation process may comprise (i) providing a user validation test to the device (e.g., a challenge-response test, such as a Completely Automated Public Turing test to tell Computers and Humans Apart (CAPTCHA)), (ii) receiving a response to the user validation test, and/or (iii) determining, based upon the response, whether or not the user of the device is human.

In some examples, the plurality of events may comprise one or more registration events in which a registration process is performed in association with a device associated with an IP address of the plurality of IP addresses. For example, the registration process may be performed to register for a service (e.g., an application, a shopping platform, etc.). For example, the registration process may comprise registering a new user account with the service (e.g., registering a new email account with an email service).

In accordance with some embodiments, a multi-tier hierarchy of IP address groups is provided. FIG. 5A illustrates an example representation 508 of the multi-tier hierarchy of IP address groups. Although three tiers are shown in FIG. 5A, any quantity of tiers of the multi-tier hierarchy of IP address groups is contemplated. In some examples, each tier of the multi-tier hierarchy of IP address groups may be associated with IP address groups of a defined size. For example, a first tier "Tier 1" of the multi-tier hierarchy of IP address groups may be associated with Tier 1 IP address groups 502 each having a first size. For example, each Tier 1 IP address group may span a range of IP addresses of the first size. In an example, a first Tier 1 IP address group "Tier 1 Group A" may span a first range of IP addresses of the first size, a second Tier 1 IP address group "Tier 1 Group B" may span a second range of IP addresses of the first size, etc. A second tier "Tier 2" of the multi-tier hierarchy of IP address groups may be associated with Tier 2 IP address groups 504 each having a second size. In an example, a first Tier 2 IP address group "Tier 2 Group A" may span a third range of IP addresses of the second size, a second Tier 2 IP address group "Tier 2 Group B" may span a fourth range of IP addresses of the second size, etc. In some examples, the second size associated with Tier 2 is larger than (e.g., at least twice) the first size associated with Tier 1. In some examples, each Tier 2 IP address group may comprise two or more Tier 1 IP address groups. For example, Tier 2 Group A may comprise Tier 1 Groups A-C, and/or Tier 2 Group B may comprise Tier 1 Groups D-F. A third tier "Tier 3" of the multi-tier hierarchy of IP address groups may be associated with one or more Tier 3 IP address groups 506 each having a third size. In an example, a first Tier 3 IP address group "Tier 3 Group A" may span a fifth range of IP addresses of the third size. In some examples, each Tier 3 IP address group may comprise two or more Tier 2 IP address groups. For example, Tier 3 Group A may comprise Tier 2 Groups A-B.

Embodiments are contemplated in which different IP address groups of a single tier (of the multi-tier hierarchy of IP address groups) have different sizes, such as sizes within a defined range of sizes associated with the single tier.

According to some embodiments of the present disclosure, IP address reputation scores may be determined for IP address groups of the multi-tier hierarchy of IP address groups.

At 404 of FIG. 4, the content system may determine a plurality of Tier 1 IP address reputation scores based upon the plurality of events. For example, the plurality of Tier 1 IP address reputation scores may be associated with at least some Tier 1 IP address groups of the multi-tier hierarchy of IP address groups. In some examples, an IP address reputation score of the plurality of Tier 1 IP address reputation scores (e.g., each IP address reputation score of the plurality of Tier 1 IP address reputation scores) may be determined for a Tier 1 IP address group based upon one or more events, of the plurality of events, associated with the Tier 1 IP address group. In some examples, each IP address reputation score of the plurality of Tier 1 IP address reputation scores may be set to a value (e.g., a floating point value) within a defined range from 0 to 1 (or other range of values).

In an example, a Tier 1 Group A IP address reputation score (associated with Tier 1 Group A) may be determined based upon one or more first events, of the plurality of events, associated with Tier 1 Group A. For example, each event of the one or more first events may be associated with an IP address of Tier 1 Group A. Alternatively and/or additionally, a Tier 1 Group B IP address reputation score (associated with Tier 1 Group B) may be determined based upon one or more second events, of the plurality of events, associated with Tier 1 Group B. For example, each event of the one or more second events may be associated with an IP address of Tier 1 Group B.

Figure 5B:
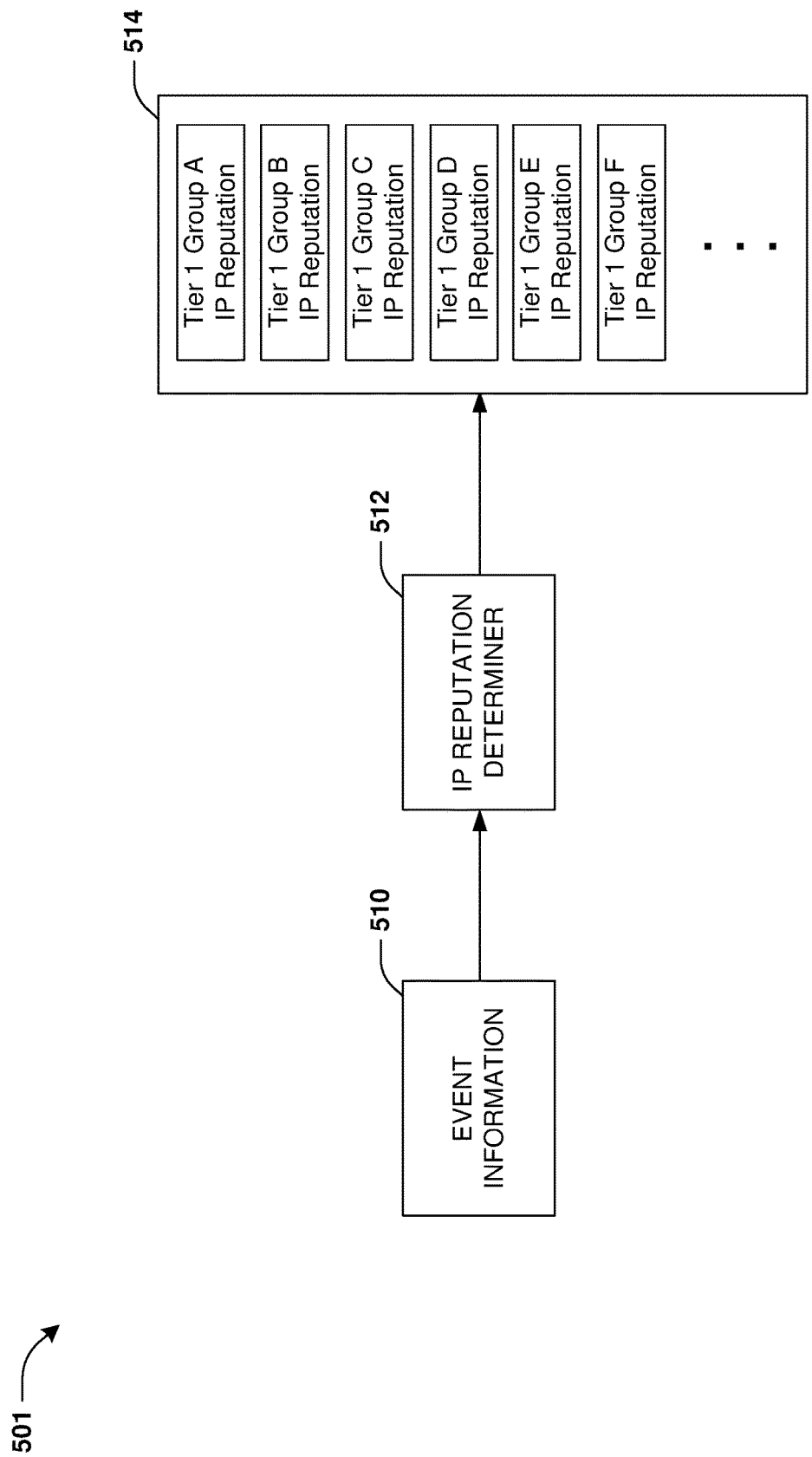
FIG. 5B is a component block diagram illustrating an example system for determining tier-based IP address reputation scores and/or identifying fraudulent requests based upon the tier-based IP address reputation scores, where event information is used to determine a plurality of Tier 1 IP address reputation scores.

In some examples, first event information associated with the plurality of IP addresses may be determined based upon the plurality of events, and/or the plurality of Tier 1 IP address reputation scores may be determined based upon the first event information. FIG. 5B illustrates determination of the plurality of Tier 1 IP address reputation scores (shown with reference number 514) using the first event information (shown with reference number 510). For example, the first event information 510 may be input to an IP reputation determiner 512, which may determine the plurality of Tier 1 IP address reputation scores 514 based upon the first event information 510. In an example, the first event information may comprise features associated with at least some Tier 1 IP address groups of the multi-tier hierarchy of IP address groups, and the IP reputation determiner 512 may determine the plurality of Tier 1 IP address reputation scores 514 based upon the features.

In an example, the first event information 510 may comprise a first set of event information associated with Tier 1 Group A (e.g., the first set of event information may be used to determine the Tier 1 Group A IP address reputation score). In some examples, the first set of event information may be indicative of a first set of features. The Tier 1 Group A IP address reputation score may be determined based upon the first set of features. The first set of features may correspond to behavioral features associated with behaviors of IP addresses of Tier 1 Group A. In some examples, the first set of features may comprise (i) one or more authentication features, (ii) one or more user validation features, (iii) one or more registration features, (iv) one or more log-in attempt features, (v) one or more desirable username features, and/or (vi) one or more other features.

In some examples, the one or more authentication features may comprise a measure of authentication events associated with Tier 1 Group A, a measure of successful authentication events associated with Tier 1 Group A, and/or a measure of unsuccessful authentication events associated with Tier 1 Group A. The measure of authentication events may correspond to at least one of a quantity, a frequency, etc. of authentication events (comprising both successful and unsuccessful authentication events, for example) performed in association with IP addresses of Tier 1 Group A. The measure of successful authentication events may correspond to at least one of a quantity, a frequency, etc. of successful authentication events performed in association with IP addresses of Tier 1 Group A. A successful authentication event may correspond to an authentication event in which a user is successfully authenticated (e.g., the user provides a correct username and password to access and/or log into a user account, for example). The measure of unsuccessful authentication events may correspond to at least one of a quantity, a frequency, etc. of unsuccessful authentication events performed in association with IP addresses of Tier 1 Group A. An unsuccessful authentication event may correspond to an authentication event in which a user is not successfully authenticated (e.g., the user provides an incorrect username and/or password and/or is prevented from accessing and/or logging into a user account, for example).

In some examples, the one or more user validation features may comprise a measure of user validation events associated with Tier 1 Group A, a measure of successful user validation events associated with Tier 1 Group A, and/or a measure of unsuccessful user validation events associated with Tier 1 Group A. The measure of user validation events may correspond to at least one of a quantity, a frequency, etc. of user validation events (comprising both successful and unsuccessful user validation events, for example) performed in association with IP addresses of Tier 1 Group A. The measure of successful user validation events may correspond to at least one of a quantity, a frequency, etc. of successful user validation events performed in association with IP addresses of Tier 1 Group A. A successful user validation event may correspond to a user validation event in which a user is successfully validated as being a person (and/or as not being a bot). In an example in which the user validation event is associated with a challenge-response test (e.g., a CAPTCHA), the user validation event may be successful if the user provides a correct response to the challenge-response test. Embodiments are contemplated in which the user validation event is associated with a challenge (e.g., a secondary challenge) in which a message (e.g., a text message, etc.) is sent to a different device of the user, and whether or not the user validation event is successful is determined based upon whether or not the user has possession of (and/or access to) the different device. The measure of unsuccessful user validation events may correspond to at least one of a quantity, a frequency, etc. of unsuccessful user validation events performed in association with IP addresses of Tier 1 Group A. An unsuccessful user validation event may correspond to a user validation event in which a user is not successfully validated as being a person (and/or as not being a bot) (e.g., the user provides an incorrect response to a challenge-response test, such as a CAPTCHA, for example).

In some examples, the one or more registration features may comprise a measure of registration events associated with Tier 1 Group A, a measure of flagged registration events associated with Tier 1 Group A, and/or a measure of un-flagged registration events associated with Tier 1 Group A. The measure of registration events may correspond to at least one of a quantity, a frequency, etc. of registration events (comprising both flagged and un-flagged registration events, for example) performed in association with IP addresses of Tier 1 Group A. The measure of flagged registration events may correspond to at least one of a quantity, a frequency, etc. of flagged registration events performed in association with IP addresses of Tier 1 Group A. A flagged registration event may correspond to a registration event that is flagged as malicious (e.g., the registration event may be flagged as a part of a mass registration campaign performed by one or more malicious actors and/or bots). The measure of un-flagged registration events may correspond to at least one of a quantity, a frequency, etc. of un-flagged registration events performed in association with IP addresses of Tier 1 Group A. An un-flagged registration event may correspond to a registration event that is not flagged as malicious and/or that is determined to be a normal registration event.

In some examples, the one or more log-in attempt features may comprise a measure of log-in attempt events associated with Tier 1 Group A, a measure of out-of-jurisdiction log-in attempt events associated with Tier 1 Group A, and/or a measure of in-jurisdiction log-in attempt events associated with Tier 1 Group A. The measure of log-in attempt events may correspond to at least one of a quantity, a frequency, etc. of log-in attempt events (comprising both out-of-jurisdiction and in-jurisdiction log-in attempt events, for example) performed in association with IP addresses of Tier 1 Group A. The measure of out-of-jurisdiction log-in attempt events may correspond to at least one of a quantity, a frequency, etc.

of out-of-jurisdiction log-in attempt events performed in association with IP addresses of Tier 1 Group A. An out-of-jurisdiction log-in attempt event may correspond to a log-in attempt event in which a device that is considered to be out-of-jurisdiction attempts to log into a user account of a service. For example, the device may be considered to be out-of-jurisdiction based upon a location of the device being outside a region (e.g., one or more states, one or more countries, etc.) associated with the service and/or the user account. The measure of in-jurisdiction log-in attempt events may correspond to at least one of a quantity, a frequency, etc. of in-jurisdiction log-in attempt events performed in association with IP addresses of Tier 1 Group A. An in-jurisdiction log-in attempt event may correspond to a log-in attempt event in which a device attempts to log into a user account of a service while being located within the region associated with the service and/or the user account.

In some examples, the one or more desirable username features may comprise a measure of user accounts (e.g., email accounts and/or other types of user account) having desirable usernames that are used in association with IP addresses of Tier 1 Group A in the plurality of events. A desirable username may correspond to a username comprising a name of at least one of a celebrity, a popular organization, etc. For example, the measure of user accounts may correspond to a quantity of user accounts, having desirable usernames, that are used to send emails, receive emails, perform registration events, etc. In an example in which Tier 1 Group A corresponds to at least one of a household, an office, etc. it may be suspicious if the measure of user accounts having desirable usernames exceeds a threshold, and thus, including the measure of user accounts in the first set of features (used to determine the Tier 1 Group A IP address reputation score, for example) may provide for more accurate determination of the Tier 1 Group A IP address reputation score.

It may be appreciated that other types of features may be included (in addition and/or as an alternative to one or more of the types of features discussed herein) in the first set of features (based upon which the Tier 1 Group A IP address reputation score is determined, for example). In some examples, the first set of features may be indicative of (i) authentication behaviors associated with IP addresses of Tier 1 Group A, (ii) account management and/or recovery events associated with IP addresses of Tier 1 Group A, (iii) Open Authorization (OAuth) events associated with IP addresses associated with Tier 1 Group A, (iv) Web Authentication (WebAuthn) events associated with IP addresses of Tier 1 Group A, (v) geographical information associated with IP addresses of Tier 1 Group A, (vi) communication channels used by IP addresses of Tier 1 Group A, (vii) browser fingerprint behavior of IP addresses of Tier 1 Group A, (viii) triggered events associated with IP addresses of Tier 1 Group A, (ix) a measure of client devices that perform internet activity using IP addresses of Tier 1 Group A, (x) a measure of different types of internet activities performed using IP addresses of Tier 1 Group A, and/or (xi) ratios of accounts by namespace, terms-of-service and/or jurisdiction.

In some examples, the IP reputation determiner 512 may comprise a machine learning model. The machine learning model may be used to determine the Tier 1 Group A IP address reputation score based upon the first set of event information (comprising the first set of features, for example). The machine learning model may, for example, comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc. In an example, the machine learning model may comprise a logistic regression model (e.g., an eXtreme Gradient Boosting (XGBoost) logistic regression machine learning model or other type of logistic regression model). In some examples, the machine learning model may be trained using training information comprising (i) one or more first sets of event information (e.g., features disclosed herein with respect to the first set of features) associated with one or more IP address groups known to be used for fraudulent activity, and/or (ii) one or more second sets of event information (e.g., features disclosed herein with respect to the first set of features) associated with one or more IP address groups that are not associated with fraudulent activity. Accordingly, using the training information, the machine learning model may be trained to differentiate between behavior of IP address groups that are associated with fraudulent activity and behavior of IP address groups that are not associated with fraudulent activity.

In some examples, the first set of features may be used (in conjunction with the machine learning model, for example) to determine a first short-term IP address reputation score associated with Tier 1 Group A. The first short-term IP address reputation score may be used to determine the Tier 1 Group A IP address reputation score, which may correspond to a long-term (e.g., overall) IP address reputation score. In some examples, a short-term score determination process associated with Tier 1 Group A may be performed periodically, such as once per first duration. In an example, the first duration may correspond to one day, and thus, the short-term score determination process may be performed daily. In some examples, the short-term score determination process may comprise determining a short-term IP address reputation score based upon events, associated with Tier 1 Group A, that occur within a period of time having the first duration (e.g., one day). In an example, the first set of event information (comprising the first set of features, for example) may be based upon events (of the plurality of events, for example) that occur within a first period of time having the first duration. A first short-term score determination process may be performed based upon the first set of event information to determine the first short-term IP address reputation score associated with Tier 1 Group A. For example, the first short-term IP address reputation score may be determined, using the machine learning model, based upon the first set of event information. In response to determining the first short-term IP address reputation score, the Tier 1 Group A IP address reputation score (e.g., the long-term IP address reputation score) may be determined based upon the first short-term IP address reputation score.

In an example in which the Tier 1 Group A IP address reputation score is already determined when the first short-term IP address reputation score is determined, the Tier 1 Group A IP address reputation score may be updated based upon the first short-term IP address reputation score (e.g., determining the Tier 1 Group A IP address reputation score based upon the first short-term IP address reputation score may comprise updating the Tier 1 Group A IP address reputation score based upon the first short-term IP address reputation score). In an example in which the first short-term IP address reputation score is higher than a current value of the Tier 1 Group A IP address reputation score, the Tier 1 Group A IP address reputation score may be increased from the current value to a higher value based upon the first short-term IP address reputation score. In an example in which the first short-term IP address reputation score is lower than the current value of the Tier 1 Group A IP address reputation score, the Tier 1 Group A IP address reputation score may be reduced from the current value to a lower value based upon the first short-term IP address reputation score.

In some examples, the Tier 1 Group A IP address reputation score and/or a first confidence level of the Tier 1 Group A IP address reputation score may be determined based upon the first short-term IP address reputation score using a model (e.g., a heuristic model). In an example, the first short-term IP address reputation score may be converted to a directional impact (e.g., a positive or negative change) on the current value of the Tier 1 Group A IP address reputation score (using the model, for example) based upon a magnitude of the first short-term IP address reputation score and/or a past scoring history of Tier 1 Group A (e.g., the past scoring history may comprise one or more historical short-term IP address reputation scores associated with Tier 1 Group A and/or one or more historical values of the Tier 1 Group A IP address reputation score). The directional impact may be applied to the current value of the Tier 1 Group A IP address reputation score (e.g., if the directional impact is +0.2, 0.2 may be added to the current value to determine an updated value of the Tier 1 Group A IP address reputation score). In some examples, extreme short-term scores (e.g., scores closer to 1 or 0 than to a neutral score of 0.5) may influence the Tier 1 Group A IP address reputation score more strongly than neutral scores (e.g., scores closer to 0.5 than to an extreme score of 1 or 0). In an example in which the current value of the Tier 1 Group A IP address reputation score is 0.5 (e.g., a neutral score between a low extreme of 0 and a high extreme of 1) and the first short-term IP address reputation score is 0.98, the Tier 1 Group A IP address reputation score may be increased from 0.5 to 0.7, whereas if the first short-term IP address reputation score were 0.7, for example, the Tier 1 Group A IP address reputation score may be increased from 0.5 to 0.55. In some examples, consistent short-term IP address reputation scores associated with Tier 1 Group A may push the Tier 1 Group A IP address reputation score towards an extreme value (e.g., 0 or 1) and/or may push the first confidence level towards a high confidence level (e.g., 1). In an example, if consecutive short-term IP address reputation scores associated with Tier 1 Group A are determined to be around 0.95, the Tier 1 Group A IP address reputation score may approach 0.95 over time. In an example, the model (e.g., the heuristic model) may provide a gravity towards a neutral score (e.g., 0.5) in the event of inconsistent short-term IP address reputation scores associated with Tier 1 Group A. For example, the model may resist large changes to the Tier 1 Group A IP address reputation score that break from historical patterns. Alternatively and/or additionally, the first confidence level may be reduced in response to determining inconsistent short-term IP address reputation scores associated with Tier 1 Group A.

In an example in which the Tier 1 Group A IP address reputation score is not already determined when the first short-term IP address reputation score is determined, an IP reputation score initialization process may be performed. The IP reputation score initialization process may comprise (i) setting the Tier 1 Group A IP address reputation score to a defined beginning score (e.g., the defined beginning score may be 0.5) and/or setting the first confidence level of the Tier 1 Group A IP address reputation score to a defined beginning confidence level (e.g., the defined beginning confidence level may be 0), and/or (ii) updating the Tier 1 Group A IP address reputation score (which is set to the defined beginning score, for example) based upon the first short-term IP address reputation score. In an example in which the first short-term IP address reputation score is higher than the defined beginning score, the Tier 1 Group A IP address reputation score may be increased from the defined beginning score to a higher value based upon the first short-term IP address reputation score. In an example in which the first short-term IP address reputation score is lower than the defined beginning score, the Tier 1 Group A IP address reputation score may be reduced from the defined beginning score to a lower value based upon the first short-term IP address reputation score. In an example in which the defined beginning score is 0.5, and the first short-term IP address reputation score is 0.98 (e.g., which approaches a high extreme of 1), the Tier 1 Group A IP address reputation score may be increased from 0.5 to 0.7.

Figure 5C:
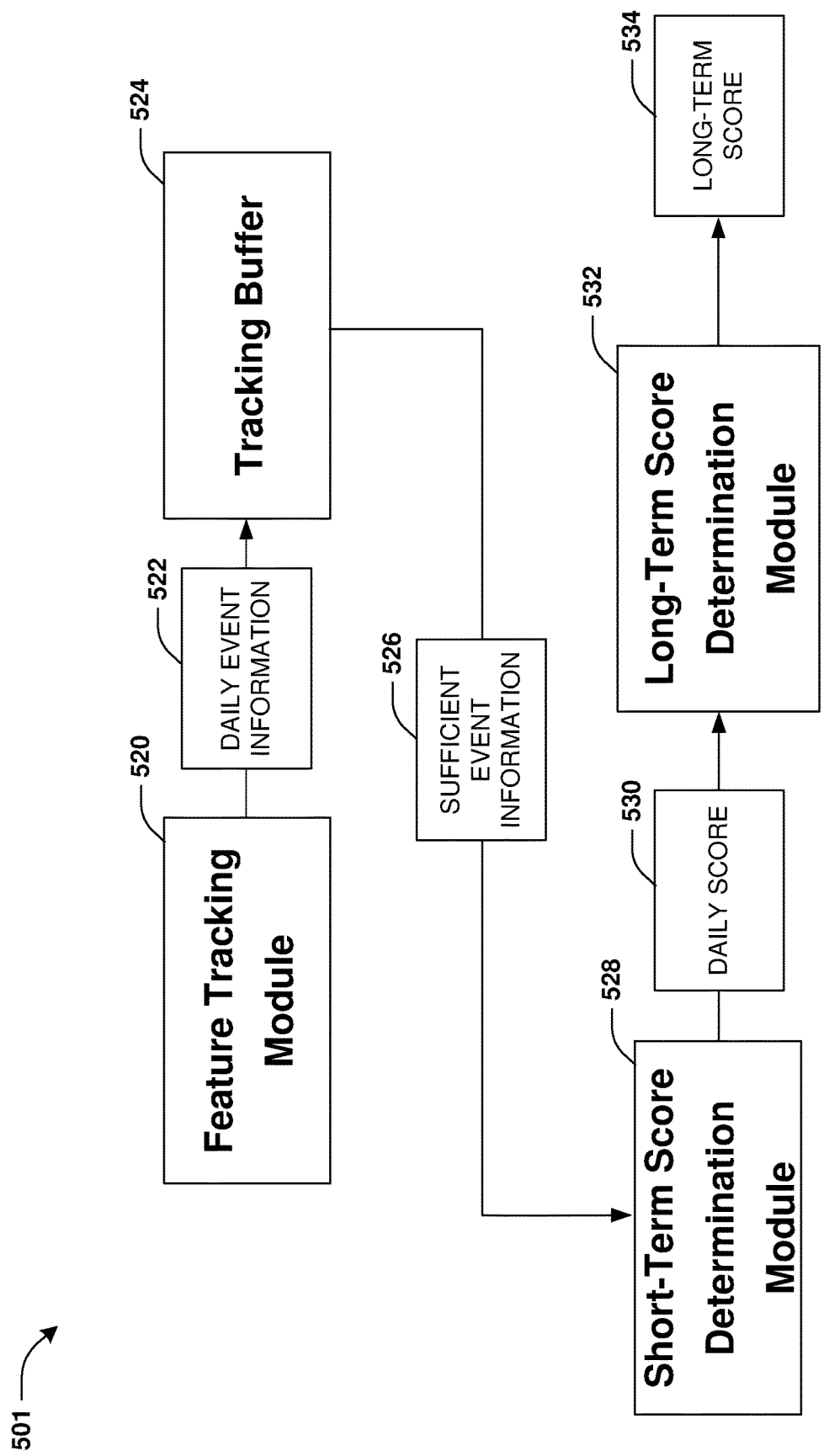
FIG. 5C is a component block diagram illustrating an example system for determining tier-based IP address reputation scores and/or identifying fraudulent requests based upon the tier-based IP address reputation scores, where a Tier 1 Group A IP address reputation score is determined.

FIG. 5C illustrates an example of determining and/or updating the Tier 1 Group A IP address reputation score (shown with reference number 534). In the example shown in FIG. 5C, the first duration is one day. It may be appreciated that other values (e.g., 12 hours, 36 hours, two days, one week, etc.) of the first duration are within the scope of the present disclosure. A feature tracking module 520 may monitor events (e.g., the plurality of events) over the first period of time having the first duration (e.g., one day) to determine the first set of event information (shown with reference number 522) indicative of the first set of features associated with Tier 1 Group A, and may provide the first set of event information 522 to a tracking buffer 524. For example, the feature tracking module 520 may determine and/or provide a set of event information once per the first duration (e.g., daily). The tracking buffer 524 may store the first set of event information 522 associated with Tier 1 Group A, and may determine whether or not the first set of event information 522 meets a sufficient data condition for a short-term IP address reputation score to be determined for Tier 1 Group A using the first set of event information 522. In response to a determination that the first set of event information 522 meets the sufficient data condition, the tracking buffer 524 may provide the first set of event information 522 to a short-term score determination module 528. Alternatively and/or additionally, in response to a determination that the first set of event information 522 does not meet the sufficient data condition, the tracking buffer 524 may wait to be provided with a second set of event information associated with Tier 1 Group A. For example, the feature tracking module 520 may provide the second set of event information to the tracking buffer 524 in a second period of the first duration (e.g., the second period may be after the first period). In response to the second set of event information, the feature tracking module 520 may determine whether or not buffered event information associated with Tier 1 Group A (e.g., the buffered event information may comprise the first set of event information 522 and the second set of event information) meets the sufficient data condition. In response to determining that the buffered event information meets the sufficient data condition, the tracking buffer 524 may provide the buffered event information to the short-term score determination module 528. If the buffered event information does not meet the sufficient data condition, the tracking buffer 524 may wait to be provided with further event information (over one or more periods of the first duration, for example), and once the tracking buffer 524 determines that the buffered event information (including the first set of event information 522 associated with the first period, the second set of event information associated with the second period, and/or the further event information) meets the sufficient data condition, the tracking buffer 524 may provide sufficient event information 526 (comprising the buffered event information) to the short-term score determination module 528. Accordingly, the tracking buffer 524 may monitor the buffered event information associated with Tier 1 Group A, and may trigger short-term scoring for Tier 1 Group A in response to the sufficient data condition being met.

In some examples, whether or not the first set of event information 522 meets the sufficient data condition may be determined based upon at least one of a quantity of features indicated by the first set of event information 522, a quantity of events (associated with Tier 1 Group A, for example) based upon which the first set of event information 522 is determined, an amount of data of the first set of event information 522, etc. In an example, the tracking buffer 524 may determine that the first set of event information 522 meets the sufficient data condition based upon (i) a determination that the quantity of features meets (e.g., exceeds) a threshold quantity of features, (ii) a determination that the quantity of events meets (e.g., exceeds) a threshold quantity of events, and/or (iii) a determination that the amount of data meets (e.g., exceeds) a threshold amount of data.

In some examples, the short-term score determination module 528 may use the sufficient event information 526 to perform the first short-term score determination process to determine (using the machine learning model, for example) the first short-term IP address reputation score (shown with reference number 530), which may also be referred to as a "daily score" when the first duration corresponds to one day. Alternatively and/or additionally, the tracking buffer 524 may provide the short-term score determination module 528 with one or more buffer features (e.g., associated with internal processing of the tracking buffer 524). The one or more buffer features may be indicative of (i) an amount of time that event information (e.g., the first set of event information 522) associated with Tier 1 Group A is buffered in the tracking buffer 524 before being provided (to the short-term score determination module 528, for example) for scoring, (ii) an amount of time between scorings (e.g., determinations of short-term IP address reputation scores) associated with Tier 1 Group A, and/or (iii) a quantity of entities (e.g., IP addresses, client devices, etc.) associated with Tier 1 Group A and/or the buffered event information. The first short-term IP address reputation score 530 may be determined based upon the one or more buffer features. The first short-term IP address reputation score 530 may be input to a long-term score determination module 548, which may use the first short-term IP address reputation score 530 to determine (e.g., update) the Tier 1 Group A IP address reputation score 534 (e.g., long-term score).

Thus, in accordance with some of the techniques provided herein, short-term IP address reputation scores associated with Tier 1 Group A may be determined (e.g., determined periodically) over time, and the short-term IP address reputation scores may be used to update (e.g., periodically update) the Tier 1 Group A IP address reputation score 534, thereby improving an accuracy and/or confidence of the Tier 1 Group A IP address reputation score 534 over time.

In some examples, other Tier 1 IP address reputation scores of the plurality of Tier 1 IP address reputation scores 514 may be determined (and/or periodically updated) using one or more of the techniques provided herein with respect to determining (and/or periodically updating) the Tier 1 Group A IP address reputation score 534.

At 406 of FIG. 4, the content system may determine a Tier 2 Group A IP address reputation score associated with Tier 2 Group A based upon the plurality of Tier 1 IP address reputation scores 514. For example, a plurality of Tier 2 IP address reputation scores (comprising the Tier 2 Group A IP address reputation score) associated with the Tier 2 IP address groups 504 may be determined based upon the plurality of Tier 1 IP address reputation scores 514. In some examples, the Tier 2 Group A IP address reputation score may be determined based upon a set of Tier 1 IP address reputation scores, of the plurality of Tier 1 IP address reputation scores 514, that are associated with one or more Tier 1 groups within Tier 2 Group A. For example, the set of Tier 1 IP address reputation scores used to determine the Tier 2 Group A IP address reputation score may comprise IP address reputation scores associated with Tier 1 Groups A-C.

Figure 5D:
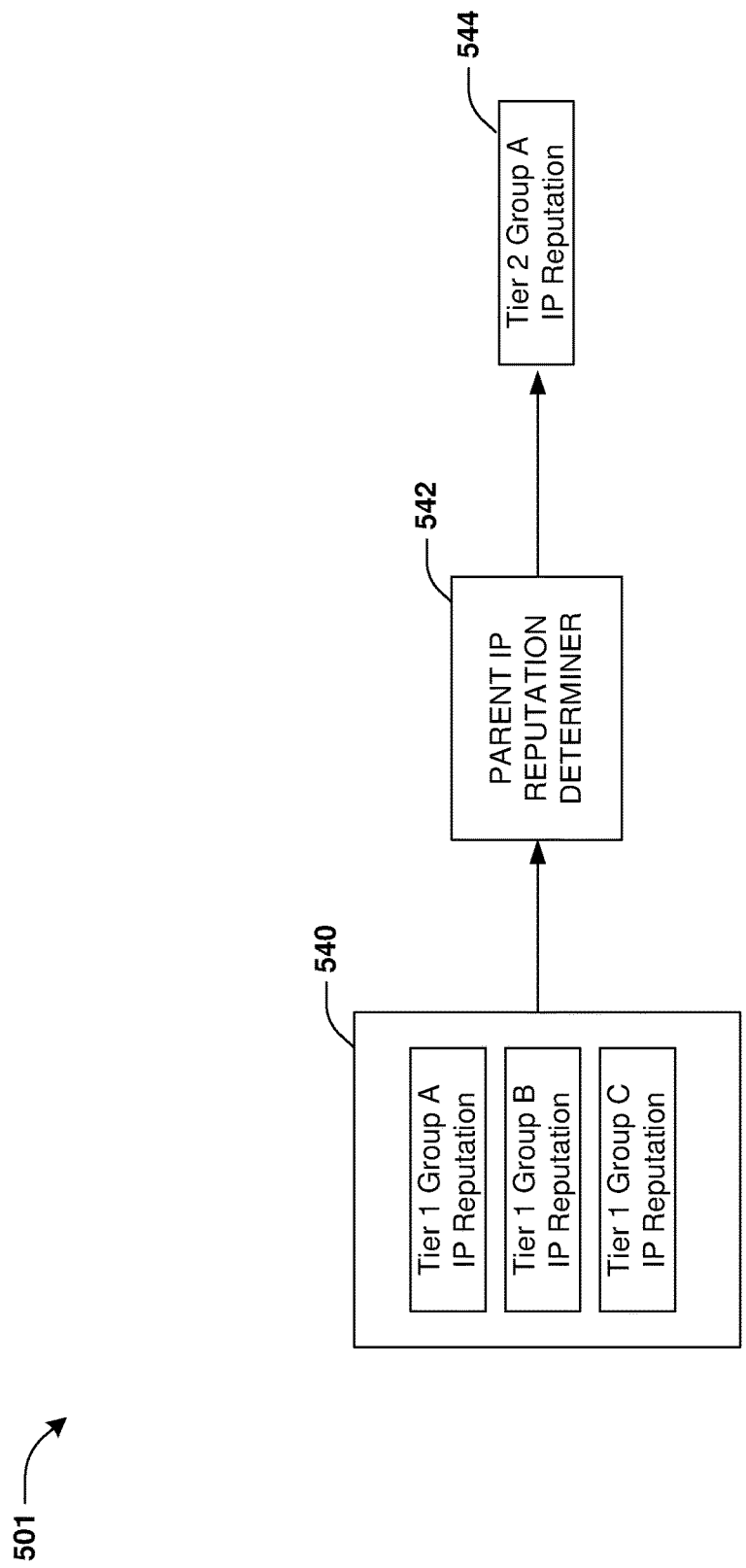
FIG. 5D is a component block diagram illustrating an example system for determining tier-based IP address reputation scores and/or identifying fraudulent requests based upon the tier-based IP address reputation scores, where a Tier 2 Group A IP address reputation score is determined.

FIG. 5D illustrates determination of the Tier 2 Group A IP address reputation score (shown with reference number 544). In some examples, the set of Tier 1 IP address reputation scores (shown with reference number 540) may be input to a parent IP reputation score determiner 542, which may use the set of Tier 1 IP address reputation scores 540 to determine the Tier 2 Group A IP address reputation score 544.

In some examples, the set of Tier 1 IP address reputation scores 540 may be combined to determine the Tier 2 Group A IP address reputation score 544. For example, one or more operations (e.g., mathematical operations) may be performed using the set of Tier 1 IP address reputation scores 540 to determine the Tier 2 Group A IP address reputation score 544. In some examples, the Tier 2 Group A IP address reputation score 544 may be determined based upon one or more weights associated with the set of Tier 1 IP address reputation scores 540. For example, the one or more weights may be based upon (i) one or more confidence levels of the set of Tier 1 IP address reputation scores 540, and/or (ii) one or more traffic volumes associated with the set of Tier 1 IP address reputation scores 540 (e.g., traffic volumes of Tier 1 IP address groups associated with the set of Tier 1 IP address reputation scores 540). For example, the one or more weights may comprise a first weight associated with the Tier 1 Group A IP address reputation score 534 and/or a second weight associated with the Tier 1 Group B IP address reputation score. In an example, the first weight may be higher than the second weight based upon the first confidence level associated with the Tier 1 Group A IP address reputation score 534 being higher than a second confidence level associated with the Tier 1 Group B IP address reputation score, and thus, the Tier 1 Group A IP address reputation score 534 may have a larger influence on the Tier 2 Group A IP address reputation score 544 than the Tier 1 Group B IP address reputation score. Alternatively and/or additionally, the first weight may be a function of the first confidence level and/or a first traffic volume associated with Tier 1 Group A, wherein an increase of the first confidence level and/or an increase of the first traffic volume may correspond to an increase of the first weight. In an example, the Tier 2 Group A IP address reputation score 544 may correspond to an average (e.g., a weighted average) of the set of Tier 1 IP address reputation scores 540.

In some examples, the Tier 2 Group A IP address reputation score 544 may be determined (e.g., recalculated and/or updated) periodically, such as once per the first duration (e.g., if the first duration is one day, the Tier 2

Group A IP address reputation score 544 may be updated daily). For example, the Tier 2 Group A IP address reputation score 544 may be determined (e.g., recalculated and/or updated) based upon updated values of the set of Tier 1 IP address reputation scores 540.

In some examples, other Tier 2 IP address reputation scores of the plurality of Tier 2 IP address reputation scores may be determined (and/or periodically recalculated and/or updated) using one or more of the techniques provided herein with respect to determining (and/or periodically recalculating and/or updating) the Tier 2 Group A IP address reputation score 544.

In some examples, one or more Tier 3 IP address reputation scores associated with the one or more Tier 3 IP address groups 506 may be determined based upon the plurality of Tier 2 IP address reputation scores. For example, the one or more Tier 3 IP address reputation scores may comprise a Tier 3 Group A IP address reputation score associated with Tier 3 Group A. The Tier 3 Group A IP address reputation score may be determined based upon a set of Tier 2 IP address reputation scores that are associated with Tier 2 IP address groups within Tier 3 Group A. For example, the set of Tier 2 IP address reputation scores may comprise IP address reputation scores associated with Tier 2 Groups A-B. In some examples, the Tier 3 Group A IP address reputation score may be determined based upon the set of Tier 2 IP address reputation scores using one or more of the techniques provided herein with respect to determining the Tier 2 Group A IP address reputation score 544 based upon the set of Tier 1 IP address reputation scores 540.

In some examples, the Tier 3 Group A IP address reputation score may be determined (e.g., recalculated and/or updated) periodically, such as once per the first duration (e.g., if the first duration is one day, the Tier 3 Group A IP address reputation score may be updated daily). For example, the Tier 3 Group A IP address reputation score may be determined (e.g., recalculated and/or updated) based upon updated values of the set of Tier 2 IP address reputation scores.

In some examples, other Tier 3 IP address reputation scores may be determined (and/or periodically recalculated and/or updated) using one or more of the techniques provided herein with respect to determining (and/or periodically recalculating and/or updating) the Tier 3 Group A IP address reputation score.

Thus, in accordance with one or more of the techniques provided herein, IP address reputation scores for IP address groups of each tier of the multi-tier hierarchy of IP address groups may be determined.

In some examples, Tier 1 IP address groups may correspond to subscriber endpoint-level IP address groups, such as IP address groups of subscriber endpoints. In an example, a subscriber endpoint may correspond to a subscriber of an internet service provider, such as at least one of a household, an office, etc. A Tier 1 IP address group (e.g., a subscriber endpoint-level IP address group) may correspond to a group of IP addresses allotted (by the internet service provider, for example) to the subscriber. For example, the group of IP addresses may be allotted to a modem (e.g., a cable modem) used by users in at least one of the household, the office, etc., and the modem may assign IP addresses, from the group of IP addresses, to users of the modem. Accordingly, the Tier 1 Group A IP address reputation score 534 may be reflective of behaviors of one or more users (e.g., 1 to 10 users) associated with a first subscriber endpoint (e.g., a household, an office, etc.). In some examples, the first size (associated with Tier 1 IP address groups) may correspond to a /56 Classless Inter-Domain Routing (CIDR) Internet Protocol version 6 (IPv6) range (e.g., each Tier 1 IP address group that includes IPV6 addresses may correspond to a /56 CIDR block). Alternatively and/or additionally, the first size may correspond to a /24 CIDR Internet Protocol version 4 (IPv4) range (e.g., each Tier 1 IP address group that includes IPv4 addresses may correspond to a /24 CIDR block).

In some examples, Tier 2 IP address groups may correspond to provider site-level IP address groups. In an example, a provider site may correspond to a site (of an internet service provider, for example) that provides internet service to a region (e.g., a neighborhood, a small town, etc.). In an example, Tier 2 Group A may correspond to a first provider site (e.g., a site of an internet service provider) that provides internet service to subscriber-endpoints (e.g., households, offices, etc.) corresponding to Tier 1 Groups A-C (with respect to FIG. 5A, for example). For example, Tier 1 Groups A-C may correspond to subscribers connected to the first provider site. Accordingly, the Tier 2 Group A IP address reputation score 544 may be reflective of behaviors of users (e.g., 100 to 10,000 users) that are provided with internet services using the first provider site. In some examples, the second size (associated with Tier 2 IP address groups) may correspond to a /48 CIDR IPV6 range (e.g., each Tier 2 IP address group that includes IPV6 addresses may correspond to a /48 CIDR block). Alternatively and/or additionally, the second size may correspond to a /16 CIDR IPV4 range (e.g., each Tier 2 IP address group that includes IPv4 addresses may correspond to a /16 CIDR block).

In some examples, Tier 3 IP address groups may correspond to Autonomous System (AS)-level IP address groups. In an example, Tier 3 Group A may correspond to a first AS (associated with a first Autonomous System Number (ASN), for example), which may correspond to a network of provider sites corresponding to Tier 2 Groups A-B (with respect to FIG. 5A, for example). Accordingly, the Tier 3 Group A IP address reputation score may be reflective of behaviors of users that are provided with internet services using provider sites associated with the first AS.

At 408 of FIG. 4, the content system may generate an IP address reputation profile based upon the plurality of Tier 1 IP address reputation scores 514, the plurality of Tier 2 IP address reputation scores, and/or Tier 3 IP address reputation scores. In an example, the IP address reputation profile may be indicative of most recent (e.g., updated) values of the plurality of Tier 1 IP address reputation scores 514, the plurality of Tier 2 IP address reputation scores, and/or Tier 3 IP address reputation scores. In an example, for each IP address reputation score in the IP address reputation profile, the IP address reputation profile may be indicative of (i) an IP address group associated with the IP address reputation score, and/or (ii) a confidence level associated with the IP address reputation score. For example, the IP address reputation profile may comprise (i) an indication of the Tier 1 Group A IP address reputation score 534 (e.g., a most recent updated value of the Tier 1 Group A IP address reputation score 534), (ii) an indication that the Tier 1 Group A IP address reputation score 534 is associated with Tier 1 Group A, and/or (iii) an indication of the first confidence level associated with the Tier 1 Group A IP address reputation score 534.

In some examples, the IP address reputation profile is indicative of tracking information associated with IP address groups (of the multi-tier hierarchy of IP address groups, for example). The tracking information may comprise (i) historical traffic volume metrics (e.g., average traffic volumes and/or other traffic volume metrics) associated with IP address groups, (ii) expected traffic volumes associated with IP address groups, (iii) one or more historical traffic spikes associated with IP address groups, and/or (iv) historical fraud-related actions associated with IP address groups (e.g., the historical fraud-related actions may comprise at least one of a historical determination of whether or not an IP address group is associated with fraudulent activity, a historical determination of whether or not a request for content from an IP addresses of an IP address group is fraudulent, a restriction placed on at least some IP addresses of an IP address group based upon detected fraudulent activity, etc.).

Figure 5E:
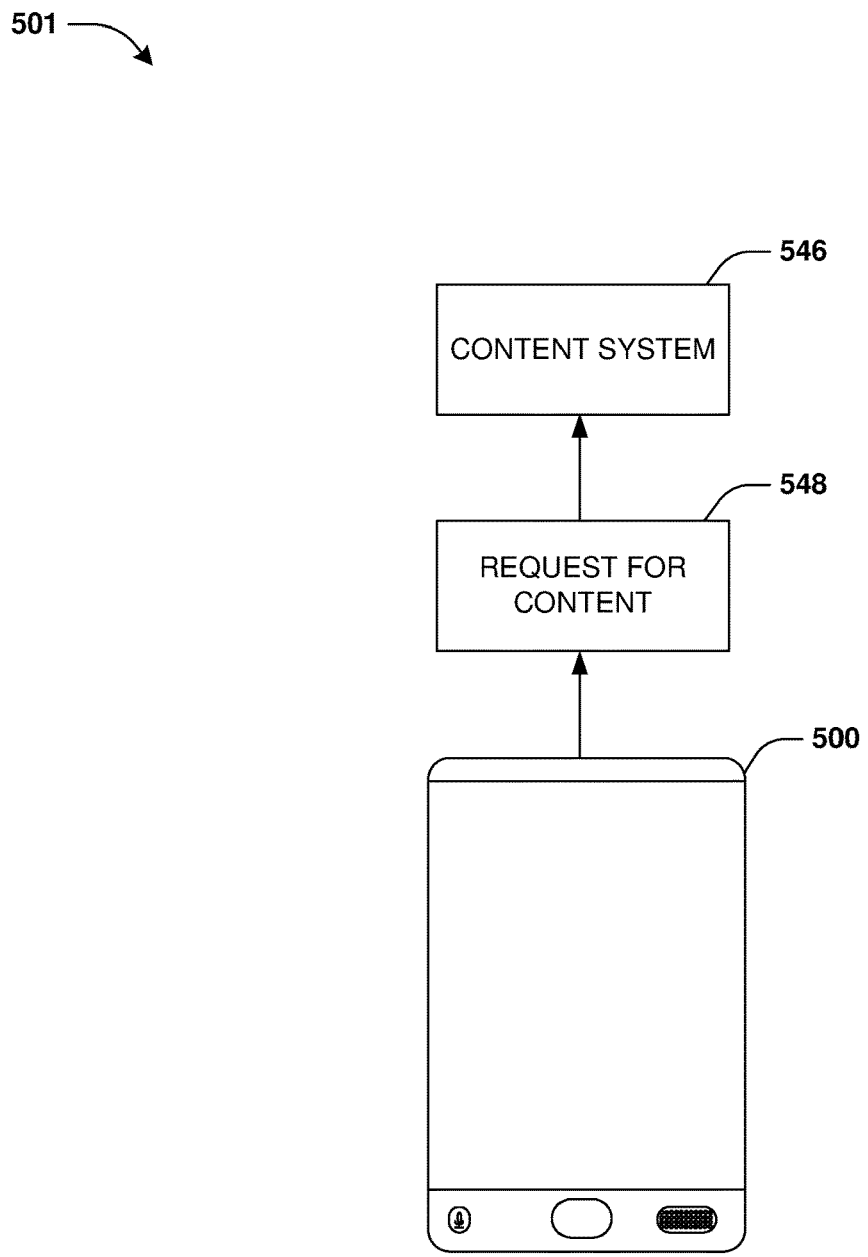
FIG. 5E is a component block diagram illustrating an example system for determining tier-based IP address reputation scores and/or identifying fraudulent requests based upon the tier-based IP address reputation scores, where a request for content is received by a server associated with a content system.

At 410 of FIG. 4, the content system may receive a first request for content associated with a first IP address. The first request for content may be indicative of the first IP address. FIG. 5E illustrates the first request for content (shown with reference number 548) received by a server 546 associated with the content system. In an example, the first request for content 548 may be sent by a client device 500 (e.g., at least one of a laptop, a desktop computer, a phone, a computer, a wearable device, a smart device, a television, any other type of computing device, hardware, etc.). The client device 500 may be assigned the first IP address. The first request for content 548 may be a request for the content system to provide a content item (e.g., an advertisement, an image, a link, a video, etc.) for presentation via the client device 500.

At 412 of FIG. 4, a fraud risk score associated with the first request for content 548 may be determined based upon the IP address reputation profile and/or the first IP address associated with the first request for content 548. In some examples, the fraud risk score may be used to determine whether or not the first request for content 548 is fraudulent. The fraud risk score may correspond to a likelihood that the first request for content 548 is associated with fraudulent activity (e.g., advertising fraud).

In some examples, the IP address reputation profile may be analyzed to identify one or more IP address reputation scores associated with the first IP address. For example, the one or more IP address reputation scores may be associated with one or more IP address groups (of the multi-tier hierarchy of IP address groups, for example) that comprise the first IP address. In some examples, the one or more IP address reputation scores may comprise (i) a first Tier 1 IP address reputation score that is associated with the first IP address (e.g., the first Tier 1 IP address reputation score may be associated with a first Tier 1 IP address group that comprises the first IP address), (ii) a first Tier 2 IP address reputation score that is associated with the first IP address (e.g., the first Tier 2 IP address reputation score may be associated with a first Tier 2 IP address group that comprises the first IP address), and/or (iii) a first Tier 3 IP address reputation score that is associated with the first IP address (e.g., the first Tier 3 IP address reputation score may be associated with a first Tier 3 IP address group that comprises the first IP address). In an example, the first Tier 1 IP address group may correspond to a subscriber endpoint (e.g., a household, an office, etc.). For example, the first Tier 1 IP address group may correspond to a group of IP addresses allotted to a modem (associated with the subscriber endpoint) to which the client device 500 and/or one or more other client devices are connected. The modem may assign the first IP address (from the first Tier 1 IP address group) to the client device 500. The first Tier 1 IP address reputation score may be reflective of behaviors of one or more users (e.g., 1 to 10 users) associated with the subscriber endpoint (e.g., one or more users connected to the modem).

However, there may be situations in which a Tier 1 IP address reputation score is not available for the first IP address, such as due, at least in part, to insufficient event data (e.g., zero event data and/or less than a threshold amount of event data) being available for determining an IP address reputation score for the first Tier 1 IP address group comprising the first IP address. In a scenario in which a Tier 1 IP address reputation score is not available for the first IP address, one or more parent IP address reputation scores associated with parent groups (e.g., higher-tier groups such as the first Tier 2 IP address group and/or the first Tier 3 IP address group comprising the first IP address) may be used to determine the fraud risk score associated with the first request for content 548. For example, the IP address reputation profile may be analyzed to determine an availability of a Tier 1 IP address reputation score associated with the first IP address (e.g., an availability of a Tier 1 IP address reputation score associated with the first Tier 1 IP address group that comprises the first IP address). Based upon a determination that (i) a Tier 1 IP address reputation score associated with the first IP address is not available in the IP address reputation profile, and/or that (ii) the IP address reputation profile comprises the first Tier 2 IP address reputation score and/or the first Tier 3 IP address reputation score associated with the first IP address, the first Tier 2 IP address reputation score and/or the first Tier 3 IP address reputation score may be included in the one or more IP address reputation scores and/or may be used to determine the fraud risk score.

Alternatively and/or additionally, there may be a situation in which there are zero IP address reputation scores (for any tier of the multi-tier hierarchy of IP address groups) available in the IP address reputation profile for the first IP address. In a scenario in which zero IP address reputation scores are available for the first IP address, the first IP address may be flagged as suspicious (since there being zero IP address reputations scores available for a given IP address is unusual, for example). The fraud risk score may be determined based upon the first IP address being flagged as suspicious (e.g., the fraud risk score may be increased based upon the first IP address being flagged as suspicious). Alternatively and/or additionally, in response to determining that zero IP address reputations score are available for the first IP address, a new IP address reputation score may be determined for the first IP address. For example, the new IP address reputation score and/or a confidence level associated with the new IP address reputation score may be set to a defined IP address reputation score (e.g., 0.5) and/or a defined confidence level (e.g., 0, indicating low confidence), respectively. The new IP address reputation score and/or the confidence level may be used to determine the fraud risk score. The defined IP address reputation score and/or the defined confidence level may be used for IP addresses for which zero IP address reputations score are available in the IP address reputation profile.

In some examples, the fraud risk score associated with the first request for content 548 may be determined based upon the tracking information of the IP address reputation profile. For example, the tracking information may be analyzed to identify one or more tracking metrics comprising (i) a historical traffic volume metric associated with the first Tier 1 IP address group that comprises the first IP address, (ii) one or more historical traffic volume metrics associated with IP address groups, other than the first Tier 1 IP address group, that are within a parent IP address group of the first Tier 1 IP address group (e.g., the parent IP address group may correspond to the first Tier 2 IP address group and/or the first Tier 3 IP address group), (iii) an expected traffic volume metric associated with the first Tier 1 IP address group, and/or (iv) one or more expected traffic volume metrics associated with IP address groups, other than the first Tier 1 IP address group, that are within the parent IP address group of the first Tier 1 IP address group. In some examples, the one or more tracking metrics may be compared with one or more recent metrics (e.g., tracking metrics associated with the last 15 minutes, the last hour or a current day) to determine the fraud risk score. For example, the fraud risk score may be increased (to reflect an increased risk of fraud, for example) based upon a determination that a difference between a tracking metric of the one or more tracking metrics and a recent metric of the one or more recent metrics (e.g., a difference between a historical average traffic volume and a traffic volume of the last 15 minutes) exceeds a threshold (e.g., the difference exceeding the threshold may be reflective of a change in behavior that may be due to a malicious actor using IP addresses of the first Tier 1 IP address group to perform fraudulent activity). Alternatively and/or additionally, the fraud risk score may be increased (to reflect an increased risk of fraud, for example) based upon identification of one or more recent traffic spikes (e.g., one or more traffic spikes in the last hour, in a current day, or in another period of time) associated with the first Tier 1 IP address group. Determining the fraud risk score based upon the difference exceeding the threshold and/or the change in behavior associated with the first Tier 1 IP address group (and/or based upon identification of one or more recent traffic spikes indicated by the tracking information) may enable the content system to respond rapidly to cases where one or more IP addresses (e.g., the first IP address and/or the first Tier 1 IP address group) have a positive IP address reputation score (e.g., over 0.5), but the one or more IP addresses were compromised by one or more malicious actors and/or the positive IP address reputation score was achieved via farming performed by the one or more malicious actors, and the malicious actors attempt a spike of fraudulent activity. Alternatively and/or additionally, based upon the difference exceeding the threshold and/or the change in behavior associated with the first Tier 1 IP address group (and/or based upon identification of one or more recent traffic spikes indicated by the tracking information), a future short-term score determination process performed for the first Tier 1 IP address group may produce a short-term IP address reputation score with a lower value compared to previous IP address reputation scores determined for the first Tier 1 IP address group. The short-term IP address reputation score may (then) be used to update the first Tier 1 IP address reputation score (associated with the first Tier 1 IP address group), the first Tier 2 IP address reputation score (associated with the first Tier 2 IP address group comprising the first Tier 1 IP address group), and/or the first Tier 3 IP address reputation score (associated with the first Tier 3 IP address group comprising the first Tier 2 IP address group).

Alternatively and/or additionally, environment information associated with the first Tier 1 IP address group may be determined based upon the IP address reputation profile, and/or the environment information may be used to determine the fraud risk score and/or whether or not the first request for content 548 is fraudulent. For example, the environment information may be indicative of (i) a historical IP address reputation scores associated with related IP address groups, other than the first Tier 1 IP address group, that are within a parent IP address group of the first Tier 1 IP address group (e.g., the parent IP address group may correspond to the first Tier 2 IP address group and/or the first Tier 3 IP address group). In an example, even in scenarios in which the first Tier 1 IP address reputation score (associated with the first Tier 1 IP address group comprising the first IP address) is not available, the environment information may be used to determine (with increased accuracy, for example) the fraud risk score (and/or whether or not the first request for content 548 is fraudulent). In some examples, the fraud risk score may be increased (to reflect an increased risk of fraud, for example) based upon a determination (based upon the environment information) that IP address reputation scores associated with the related IP address groups are decreasing over time, thereby enabling the content system to respond rapidly to cases where malicious actors attempt to diversify to new IP addresses to avoid detection.

In some examples, whether or not the first request for content 548 is fraudulent may be determined based upon the fraud risk score. For example, the fraud risk score may be compared with a first threshold fraud risk score to determine whether or not the first request for content 548 is fraudulent. In some examples, the first request for content 548 may be determined to be fraudulent based upon a determination that the fraud risk score associated with the first request for content 548 meets (e.g., exceeds) the first threshold fraud risk score.

Alternatively and/or additionally, a user reputation-based fraud risk score associated with a user and/or a user account of the client device 500 may be determined. In an example, the user reputation-based fraud risk score may correspond to a likelihood that the user and/or the user account of the client device 500 are associated with fraudulent activity (e.g., advertising fraud). The user reputation-based fraud risk score may be based upon activity of the user, the user account and/or the client device 500. The user reputation-based fraud risk score may be used (in conjunction with the fraud risk score, for example) to determine information associated with the first request for content 548.

In some examples, the user reputation-based fraud risk score may be compared with a second threshold fraud risk score. The first request for content 548 may be determined to be fraudulent based upon a determination that (i) the fraud risk score associated with the first request for content 548 meets (e.g., exceeds) the first threshold fraud risk score and (ii) the user reputation-based fraud risk score meets (e.g., exceeds) the second threshold fraud risk score.

In some examples, the content system may control transmission and/or reception of data (e.g., content items, such as advertisements) based upon the fraud risk score and/or the user reputation-based fraud risk score.

In some examples, the content system may transmit a content item (e.g., an advertisement) to the client device 500 in response to a determination that the first request for content 548 is not fraudulent. In an example, the first request for content 548 may correspond to an ad request, and/or the content item may comprise an advertisement provided to the client device 500 in response to the ad request.

In some examples, the content system may not transmit a content item (e.g., an advertisement) to the client device 500 in response to a determination that the first request for content 548 is fraudulent. In an example in which the first request for content 548 corresponds to an ad request, the content system may not provide an advertisement to the client device 500 in response to the first request for content 548 (based upon the determination that the first request for content 548 is fraudulent).

In some examples, based upon a first determination that (i) the fraud risk score associated with the first request for content 548 does not meet (e.g., does not exceed) the first threshold fraud risk score and/or (ii) the user reputation-based fraud risk score does not meet (e.g., does not exceed) the second threshold fraud risk score, the content system may determine that the first request for content 548 is not fraudulent and/or may provide the client device 500 with a content item (e.g., an advertisement) in response to the first request for content 548.

In some examples, based upon a second determination that (i) the fraud risk score associated with the first request for content 548 meets (e.g., exceeds) the first threshold fraud risk score and/or (ii) the user reputation-based fraud risk score does not meet (e.g., does not exceed) the second threshold fraud risk score, the content system may determine that the first request for content 548 is from a user (of the client device 500) that is human (and/or is not a malicious actor), but shares a group of IP addresses with one or more malicious actors (e.g., bots, malicious software, etc.). In some examples, based upon the second determination, the content system may exempt the user and/or the client device 500 from restrictions, and/or may provide a content item (e.g., an advertisement) to the client device 500 in response to the first request for content 548. Alternatively and/or additionally, based upon the second determination, the content system may determine that the first request for content 548 is not fraudulent and/or may provide the client device 500 with a content item (e.g., an advertisement) in response to the first request for content 548. Alternatively and/or additionally, based upon the second determination, the content system may determine that there is a likelihood that the first request for content 548 is fraudulent and/or may flag the first request for content 548 (and/or the client device 500 and/or the user account of the client device 500) as suspicious, and/or may include the client device 500 and/or the user account in a suspicious entity list for further monitoring (e.g., activity of the client device 500 and/or the user account may be monitored more closely than other client devices and/or other user accounts to check for signs of fraudulent activity).

In some examples, based upon a third determination that (i) the fraud risk score associated with the first request for content 548 does not meet (e.g., does not exceed) the first threshold fraud risk score and/or (ii) the user reputation-based fraud risk score meets (e.g., exceeds) the second threshold fraud risk score, the content system may determine that there is a likelihood that the first request for content 548 is fraudulent and/or may flag the first request for content 548 (and/or the client device 500 and/or the user account of the client device 500) as suspicious, and/or may include the client device 500 and/or the user account in the suspicious entity list for further monitoring.

In some examples, in response to determining that the first request for content 548 is fraudulent (and/or in response to determining that the fraud risk score meets the first threshold fraud risk score and/or the user reputation-based fraud risk score meets the second threshold fraud risk score), the content system may flag a first entity (e.g., the first IP address, the first Tier 1 IP address group, the client device 500 and/or the user account associated with the client device 500) as fraudulent for a defined duration of time (e.g., 1 week, 2 weeks, etc.). For example, the first entity (flagged as fraudulent) may be included in a fraud list, and/or may remain on the fraud list for the defined duration of time.

In some examples, when the first entity is flagged as fraudulent (e.g., when the first entity is included in the fraud list), the content system may not transmit content items (e.g., advertisements) transmitted to one or more client devices (e.g., the client device 500) associated with the first entity. Alternatively and/or additionally, in response to the first entity being flagged as fraudulent (e.g., in response to the first entity being included in the fraud list), the content system may reduce an amount of content items (e.g., advertisements) provided to the one or more client devices. For example, prior to the first entity being flagged as fraudulent, the content system may provide a first quantity of content items (e.g., advertisements) per unit of time to the one or more client devices. When the first entity is flagged as fraudulent (e.g., when the first entity is included in the fraud list), the content system may provide a second quantity of content items (e.g., advertisements) per unit of time to the one or more client devices, wherein the second quantity of content items per unit of time is less than the first quantity of content items per unit of time. For example, when the first entity is flagged as fraudulent (e.g., when the first entity is included in the fraud list), the content system may restrict content items being provided to one or more client devices to at most a maximum quantity of content items per unit of time (e.g., the content system may not provide the one or more client devices with more than the maximum quantity of content items per unit of time when the first entity is flagged as fraudulent). For example, when the first entity is flagged as fraudulent (e.g., when the first entity is included in the fraud list), the content system may restrict content items being provided to one or more client devices to one or more first types of content items (e.g., at least one of lower-rated content, lower-cost advertisements, etc.), and/or the content system may not provide the one or more client devices with one or more second types of content items (e.g., at least one of higher-rated content, higher-cost and/or premium advertisements, etc.).

It may be appreciated that one or more techniques provided herein may be performed using client identifiers, such as at least one of usernames, email addresses, device identifiers, network identifiers, globally unique identifiers (GUIDs), media access control addresses (MAC addresses), universally unique identifiers (UUIDs), international mobile subscriber identities (IMSIs), cookies, user agents, etc. In some examples, a multi-tier hierarchy of client identifier groups may be provided, and may have at least some of the features provided herein with respect to the multi-tier hierarchy of IP address groups. In an example, a plurality of first-tier client identifier reputation scores may be determined based upon the plurality of events (e.g., based upon the first event information 510). Determining the plurality of first-tier client identifier reputation scores comprises (i) determining a first first-tier client identifier reputation score based upon one or more first events, of the plurality of events, associated with a first first-tier client identifier group, and (ii) determining a second first-tier client identifier reputation score based upon one or more second events, of the plurality of events, associated with a second first-tier client identifier group. A second-tier client identifier reputation score associated with a second-tier client identifier group may be determined based upon the plurality of first-tier client identifier reputation scores. The second-tier client identifier group may comprise the first first-tier client identifier group and the second first-tier client identifier group. A client identifier reputation profile may be generated based upon the plurality of first-tier client identifier reputation scores and the second-tier client identifier reputation score. A request for content associated with a first client identifier may be received. A second fraud risk score associated with the request for content may be determined based upon the client identifier reputation profile and the first client identifier. For example, the second fraud risk score may be determined (based upon the client identifier reputation profile and the first client identifier) using one or more of the techniques provided herein with respect to determining the fraud risk score based upon the IP address reputation profile and the first IP address. Alternatively and/or additionally, whether or not the request for content is fraudulent may be determined based upon the client identifier reputation profile and the first client identifier (e.g., using one or more of the techniques provided herein with respect to determining whether or not the first request for content 548 is fraudulent). Alternatively and/or additionally, the content system may control transmission and/or reception of content based upon the second fraud risk score and/or whether or not the request for content is fraudulent.

It may be appreciated that the disclosed subject matter may prevent fraudulent activity, including, but not limited to, advertising fraud. For example, employing one or more of the techniques presented herein results in accurate identification of fraudulent requests and/or fraudulent entities associated with fraudulent activity. The fraudulent requests and/or fraudulent entities identified using one or more of the techniques presented herein may include requests and/or entities that otherwise may have gone undetected using other systems. Further, using one or more of the techniques herein, fraudulent requests and/or fraudulent entities may be automatically detected with increased accuracy, increased recall, lower false positive rates and/or less effort (e.g., less manual intervention), whereas other fraud detection systems that attempt to identify fraudulent entities associated with fraudulent activity have high false positive rates, low recall and require frequent manual intervention. Accordingly, it may be necessary to use one or more of the techniques herein to identify fraudulent entities. Thus, by implementing one or more of the techniques herein, it may be more difficult for a fraudulent entity to perform fraudulent activity without being detected.

Further, fraudulent entities may be discouraged from performing malicious actions (e.g., using one or more automated operation functionalities, hacking techniques, malware, etc.) to control client devices for transmission of advertisement requests because, by implementing one or more of the techniques presented herein, it is more difficult for an entity to successfully control a client device for transmission of a fraudulent advertisement request without the entity being detected as a fraudulent entity and/or the request being identified as a fraudulent advertisement request. For example, features (e.g., the first set of features) used to determine IP address reputation scores may capture behaviors (e.g., inherent behaviors) of regular people, and it may be costly for a malicious actor (e.g., a botnet) to emulate the behaviors in order to avoid being detected (e.g., emulating the behaviors may require advanced technology with databases, lookups, complex code and logic, implemented over long periods of time). Alternatively and/or additionally, discouraging malicious actors from performing fraudulent activity may lead to benefits including decreasing security resources used to mitigate advertising fraud (e.g., fewer user validation processes are needed due to fewer fraud attempts by malicious actors).

Implementation of at least some of the disclosed subject matter may lead to benefits including, but not limited to, a reduction in transmission of fraudulent advertisement requests (and/or a reduction in bandwidth) (e.g., as a result of discouraging fraudulent entities from performing malicious actions to control client devices for transmission of advertisement requests).

Alternatively and/or additionally, implementation of at least some of the disclosed subject matter may lead to benefits including a reduction in transmission of content items based upon fraudulent advertisement requests (and/or a reduction in bandwidth) (e.g., as a result of identifying fraudulent advertisement requests and/or fraudulent entities, as a result of controlling, such as restricting, transmission of data, such as content items which may include advertisements, to devices associated with the fraudulent advertisement requests and/or fraudulent entities, etc.).

Alternatively and/or additionally, implementation of at least some of the disclosed subject matter may lead to benefits including preventing fraudulent entities from receiving compensation for performing fraudulent activity (e.g., as a result of identifying fraudulent advertisement requests and/or fraudulent entities, as a result of controlling, such as restricting, transmission of data, such as content items which may include advertisements, to devices associated with the fraudulent advertisement requests and/or fraudulent entities, etc.).

Alternatively and/or additionally, implementation of at least some of the disclosed subject matter may lead to benefits including a reduction in instances that client devices are hacked and/or controlled for transmission of fraudulent advertisement requests (e.g., as a result of discouraging fraudulent entities from performing malicious actions to control client devices for transmission of fraudulent advertisement requests).

Alternatively and/or additionally, implementation of at least some of the disclosed subject matter may lead to benefits including reducing unauthorized access of client devices and/or the content system (e.g., as a result of discouraging fraudulent entities from performing malicious actions to control client devices for transmission of fraudulent advertisement requests and/or as a result of identifying a fraudulent entity associated with fraudulent activity and/or restricting transmission of content items and/or advertisements to devices associated with the fraudulent entity based upon the identification of the fraudulent entity). Alternatively and/or additionally, implementation of at least some of the disclosed subject matter may lead to benefits including decreasing security resources needed to protect client devices and/or the content system from unauthorized access.

In some examples, at least some of the disclosed subject matter may be implemented on a client device, and in some examples, at least some of the disclosed subject matter may be implemented on a server (e.g., hosting a service accessible via a network, such as the Internet).

Figure 6:
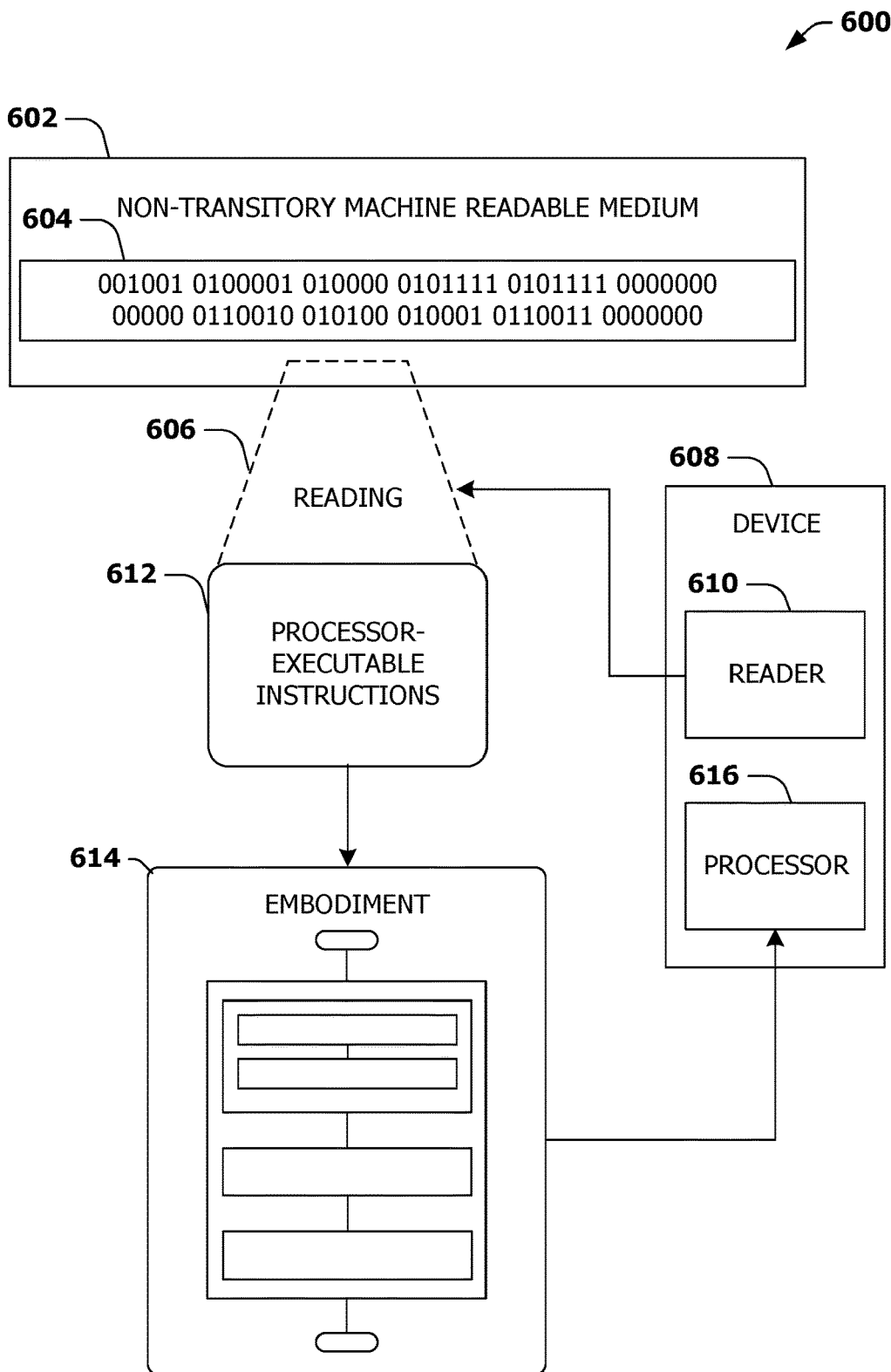
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

analyzing network activity to identify a plurality of events;

determining, based upon the plurality of events, a plurality of first-tier Internet Protocol (IP) address reputation scores, wherein determining the plurality of first-tier IP address reputation scores comprises:

determining a first first-tier IP address reputation score for a first first-tier IP address group based upon one or more first events, of the plurality of events, associated with the first first-tier IP address group; and determining a second first-tier IP address reputation score for a second first-tier IP address group based upon one or more second events, of the plurality of events, associated with the second first-tier IP address group;

determining, based upon the plurality of first-tier IP address reputation scores, a second-tier IP address reputation score for a second-tier IP address group comprising the first first-tier IP address group and the second first-tier IP address group;

generating an IP address reputation profile based upon the plurality of first-tier IP address reputation scores and the second-tier IP address reputation score for the second-tier IP address group;

receiving a request for content associated with a first IP address; and determining, based upon the IP address reputation profile and the first IP address, whether or not the request for content is fraudulent.

2. The method of claim 1, wherein determining whether or not the request for content is fraudulent comprises:

analyzing the IP address reputation profile to identify one or more IP address reputation scores associated with the first IP address; and determining whether or not the request for content is fraudulent based upon the one or more IP address reputation scores.

3. The method of claim 1, wherein determining whether or not the request for content is fraudulent comprises:

analyzing the IP address reputation profile to determine an availability of a first-tier IP address reputation score associated with the first IP address; and based upon (i) the first-tier IP address reputation score associated with the first IP address not being available in the IP address reputation profile and (ii) the second-tier IP address group comprising the first IP address, using the second-tier IP address reputation score to determine whether or not the request for content is fraudulent.

4. The method of claim 1, wherein:

each of the first first-tier IP address group and the second first-tier IP address group spans a first range of IP addresses of a first size; and the second-tier IP address group spans a second range of IP addresses of a second size at least twice the first size.

5. The method of claim 1, wherein determining the first first-tier IP address reputation score comprises:

determining, based upon the one or more first events, one or more features associated with the first first-tier IP address group; and determining the first first-tier IP address reputation score based upon the one or more features.

6. The method of claim 5, wherein the one or more features comprise at least one of:

a measure of successful authentication events associated with the first first-tier IP address group; or a measure of unsuccessful authentication events associated with the first first-tier IP address group.

7. The method of claim 5, wherein the one or more features comprise at least one of:

a measure of successful user validation events associated with the first first-tier IP address group; or a measure of unsuccessful user validation events associated with the first first-tier IP address group.

8. The method of claim 1, comprising:

determining a short-term IP address reputation score associated with the first first-tier IP address group based upon one or more third events that occur within a period of time that starts after the first first-tier IP address reputation score is determined; and updating the first first-tier IP address reputation score based upon the short-term IP address reputation score.

9. The method of claim 1, comprising:

in response to determining that the request for content is not fraudulent, transmitting a content item to a client device associated with the first IP address.

10. The method of claim 1, comprising:

in response to determining that the request for content is fraudulent, not transmitting a content item to a client device associated with the first IP address.

11. The method of claim 1, comprising:

in response to determining that the request for content is fraudulent, providing, for display on a client device associated with the first IP address, an authentication interface.

12. A computing device comprising:

a processor; and memory comprising processor-executable instructions that when executed by the processor cause performance of operations, the operations comprising:

analyzing network activity to identify a plurality of events;

determining, based upon the plurality of events, a plurality of first-tier Internet Protocol (IP) address reputation scores, wherein determining the plurality of first-tier IP address reputation scores comprises:

determining a first first-tier IP address reputation score for a first first-tier IP address group based upon one or more first events, of the plurality of events, associated with the first first-tier IP address group; and determining a second first-tier IP address reputation score for a second first-tier IP address group based upon one or more second events, of the plurality of events, associated with the second first-tier IP address group;

determining, based upon the plurality of first-tier IP address reputation scores, a second-tier IP address reputation score for a second-tier IP address group comprising the first first-tier IP address group and the second first-tier IP address group;

generating an IP address reputation profile based upon the plurality of first-tier IP address reputation scores and the second-tier IP address reputation score for the second-tier IP address group;

receiving a request for content associated with a first IP address; and determining, based upon the IP address reputation profile and the first IP address, a fraud risk score associated with the request for content.

13. The computing device of claim 12, wherein determining the fraud risk score comprises:

analyzing the IP address reputation profile to identify one or more IP address reputation scores associated with the first IP address; and determining the fraud risk score based upon the one or more IP address reputation scores.

14. The computing device of claim 12, wherein determining the fraud risk score comprises:

analyzing the IP address reputation profile to determine an availability of a first-tier IP address reputation score associated with the first IP address; and based upon (i) the first-tier IP address reputation score associated with the first IP address not being available in the IP address reputation profile and (ii) the second-tier IP address group comprising the first IP address, using the second-tier IP address reputation score to determine the fraud risk score.

15. The computing device of claim 12, wherein:

each of the first first-tier IP address group and the second first-tier IP address group spans a first range of IP addresses of a first size; and the second-tier IP address group spans a second range of IP addresses of a second size at least twice the first size.

16. The computing device of claim 12, wherein determining the first first-tier IP address reputation score comprises:

determining, based upon the one or more first events, one or more features associated with the first first-tier IP address group; and determining the first first-tier IP address reputation score based upon the one or more features.

17. The computing device of claim 16, wherein:

the first first-tier IP address group corresponds to a first subscriber endpoint;

the second first-tier IP address group corresponds to a second subscriber endpoint; and the second-tier IP address group corresponds to a provider site providing service to the first subscriber endpoint and the second subscriber endpoint.

18. The computing device of claim 16, wherein the second-tier IP address group corresponds to a geographical area comprising both the first first-tier IP address group and the second first-tier IP address group.

19. A non-transitory machine readable medium having stored thereon processor-executable instructions that when executed cause performance of operations, the operations comprising:
- analyzing network activity to identify a plurality of events;
- determining, based upon the plurality of events, a plurality of first-tier client identifier reputation scores, wherein determining the plurality of first-tier client identifier reputation scores comprises:
    - determining a first first-tier client identifier reputation score for a first first-tier client identifier group based upon one or more first events, of the plurality of events, associated with the first first-tier client identifier group; and
    - determining a second first-tier client identifier reputation score for a second first-tier client identifier group based upon one or more second events, of the plurality of events, associated with the second first-tier client identifier group;
- determining, based upon the plurality of first-tier client identifier reputation scores, a second-tier client identifier reputation score for a second-tier client identifier group comprising the first first-tier client identifier group and the second first-tier client identifier group;
- generating a client identifier reputation profile based upon the plurality of first-tier client identifier reputation scores and the second-tier client identifier reputation score for the second-tier client identifier group;
- receiving a request for content associated with a first client identifier; and
- determining, based upon the client identifier reputation profile and the first client identifier, a fraud risk score associated with the request for content.

20. The non-transitory machine readable medium of claim 19, wherein determining the fraud risk score comprises:
- analyzing the client identifier reputation profile to identify one or more client identifier reputation scores associated with the first client identifier; and
- determining the fraud risk score based upon the one or more client identifier reputation scores.

* * * * *